US011393132B2

(12) United States Patent
Faramarzi et al.

(10) Patent No.: US 11,393,132 B2
(45) Date of Patent: Jul. 19, 2022

(54) MESH COMPRESSION

(71) Applicant: Samsung Electronics Co., Ltd., Suwon-si (KR)

(72) Inventors: Esmaeil Faramarzi, Richardson, TX (US); Madhukar Budagavi, Plano, TX (US); Rajan Laxman Joshi, San Diego, CA (US); Hossein Najaf-Zadeh, Allen, TX (US); Indranil Sinharoy, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 16/810,682

(22) Filed: Mar. 5, 2020

(65) Prior Publication Data

US 2020/0286261 A1    Sep. 10, 2020

Related U.S. Application Data

(60) Provisional application No. 62/910,895, filed on Oct. 4, 2019, provisional application No. 62/909,532, filed on Oct. 2, 2019, provisional application No. 62/870,438, filed on Jul. 3, 2019, provisional application No. 62/820,942, filed on Mar. 20, 2019, provisional application No. 62/815,076, filed on Mar. 7, 2019.

(51) Int. Cl.
*G06T 9/00*    (2006.01)
*G06T 7/33*    (2017.01)

(52) U.S. Cl.
CPC .............. *G06T 9/001* (2013.01); *G06T 7/344* (2017.01); *G06T 2207/10028* (2013.01)

(58) Field of Classification Search
CPC ................... G06T 9/001; G06T 7/344; G06T 2207/10028
USPC ........................................................ 382/232
See application file for complete search history.

(56) References Cited

U.S. PATENT DOCUMENTS

2009/0278844 A1* 11/2009 Chang .................... G06T 9/001
                                                                345/419
2013/0207966 A1    8/2013 Chu et al.
(Continued)

OTHER PUBLICATIONS

Tanmay, "Surface Reconstruction from Point Cloud Data", Dec. 27, 2017, 17 pages.
(Continued)

*Primary Examiner* — Michael R Neff

(57) ABSTRACT

An encoding device, a decoding device, and a method for mesh decoding are disclosed. The method for mesh decoding includes receiving a compressed bitstream. The method also includes separating, from the compressed bitstream, a first bitstream and a second bitstream. The method further includes decoding, from the second bitstream, connectivity information of a three dimensional (3D) mesh. The method additionally includes decoding, from the first bitstream, a first frame and a second frame that include patches. The patches included in the first frame represent vertex coordinates of the 3D mesh and the patches included in the second frame represent a vertex attribute of the 3D mesh. The method also includes reconstructing a point cloud based on the first and second frames. Additionally, the method also includes applying the connectivity information to the point cloud to reconstruct the 3D mesh.

20 Claims, 25 Drawing Sheets

(56) References Cited

U.S. PATENT DOCUMENTS

| | | | |
|---|---|---|---|
| 2016/0035128 A1* | 2/2016 | Zhao | G06T 1/20 |
| | | | 345/522 |
| 2018/0189982 A1* | 7/2018 | Laroche | G06T 9/20 |
| 2018/0253867 A1* | 9/2018 | Laroche | G06T 15/04 |
| 2018/0268570 A1 | 9/2018 | Budagavi et al. | |
| 2019/0087979 A1* | 3/2019 | Mammou | G06T 9/001 |
| 2020/0196024 A1* | 6/2020 | Hwang | G06N 3/0445 |

OTHER PUBLICATIONS

N. Wongwaen et al., "Method of 3D Mesh Reconstruction from Point Cloud Using Elementary Vector and Geometry Analysis", Jun. 30, 2012, 5 pages.

Notification of Transmittal of the International Search Report and the Written Opinion of the International Searching Authority, or the Declaration dated Jun. 16, 2020 in connection with International Patent Application No. PCT/KR2020/003201, 9 pages.

Text of ISO/IEC CD 23090 5: Video-based Point Cloud Compression: Information technology—Coded Representation of Immersive Media—Part 5: Video-based Point Cloud Compression; International Organisation for Standardisation Organisation Internationale De Normalisation ISO/IEC JTC1/SC29/WG11 Coding of Moving Pictures and Audio; ISO/IEC JTC1/SC29/WG11 N18030; Oct. 2018, Macau, China; 73 pgs.

Text of ISO/IEC DIS 23090-5: Video-based Point Cloud Compression: Information technology—Coded Representation of Immersive Media—Part 5: Video-based Point Cloud Compression; ISO/IEC JTC 1/SC 29/WG 11 N18670; Oct. 10, 2019; Geneva, Switzerland; 185 pgs.

* cited by examiner

482 ⎰ ply
format ascii 1.0
element vertex 557624
property float x
property float y
property float z
property float nx
property float ny
property float nz
property uchar red
property uchar green
property uchar blue
property uchar alpha
element face 1113412
property list uchar int vertex_indices
end_header

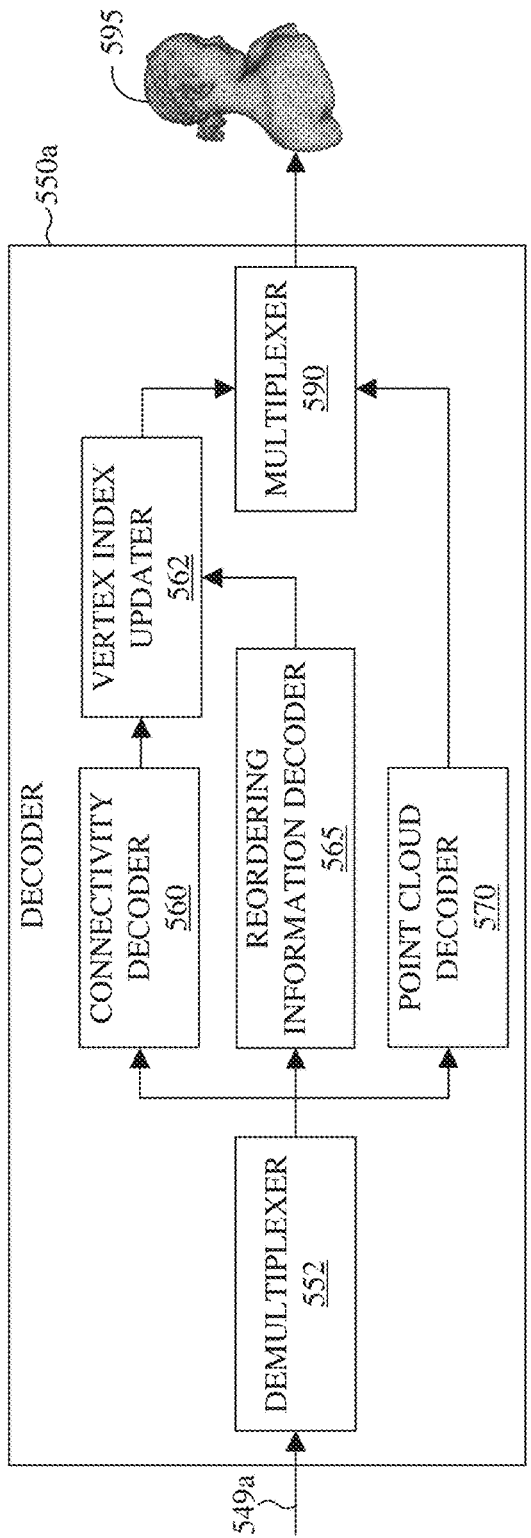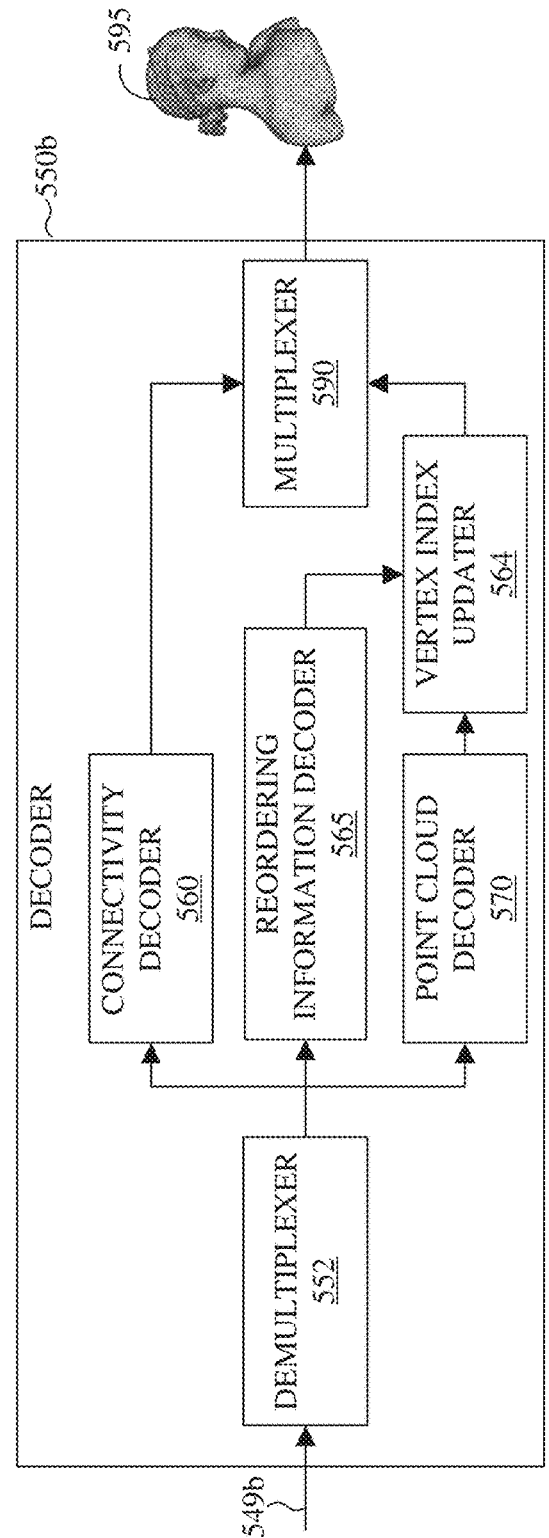

MESH COMPRESSION

CROSS-REFERENCE TO RELATED APPLICATION AND CLAIM OF PRIORITY

This application claims priority under 35 U.S.C. § 119(e) to U.S. Provisional Patent Application No. 62/815,076 filed on Mar. 7, 2019; U.S. Provisional Patent Application No. 62/820,942 filed on Mar. 20, 2019; U.S. Provisional Patent Application No. 62/870,438 filed on Jul. 3, 2019; U.S. Provisional Patent Application No. 62/909,532 filed on Oct. 2, 2019; and U.S. Provisional Patent Application No. 62/910,895 filed on Oct. 4, 2019. The above-identified provisional patent applications are hereby incorporated by reference in its entirety.

TECHNICAL FIELD

This disclosure relates generally to multimedia data. More specifically, this disclosure relates to an apparatus and a method for compressing meshes.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds, can be used in the immersive environment.

Advances in 3D technologies have spurred a new wave of innovation in the creation, transmission, and rendering of Virtual Reality (VR) Augmented Reality (AR), and Mixed Reality (MR). Point clouds meshes are common in a variety of applications such as gaming, 3D maps, visualizations, medical applications, augmented reality, virtual reality, autonomous driving, multi-view replay, 6 degrees of freedom (DoF) immersive media, to name a few. Point clouds meshes, if uncompressed, generally require a large amount of bandwidth for transmission. Due to the large bitrate requirement, point clouds and meshes are often compressed prior to transmission. Compressing a 3D object such as a point cloud or mesh often requires specialized hardware. The specialized hardware is often expensive

SUMMARY

This disclosure provides mesh compression.

In one embodiment a decoding device for mesh decoding is provided. The decoding device includes a communication interface and a processor. The communication interface is configured to receive a compressed bitstream. The processor is configured to separate a first bitstream and a second bitstream from the compressed bitstream. The processor is also configured to decode, from the second bitstream, connectivity information of a three dimensional (3D) mesh. The processor is further configured to decode, from the first bitstream, a first frame and a second frame that both include one or more patches. The one or more patches included in the first frame represent vertex coordinates of the 3D mesh and the one or more patches included in the second frame represent a vertex attribute of the 3D mesh. The processor is additionally configured to reconstruct a point cloud based on the first and second frames. Additionally, the processor is configured to apply the connectivity information to the point cloud to reconstruct the 3D mesh.

In another embodiment an encoding device for mesh encoding is provided. The encoding device includes a processor and a communication interface. The processor is configured to separate connectivity information of a three dimensional (3D) mesh from vertex coordinates and a vertex attribute, wherein the 3D mesh includes vertex indices. The processor is also configured to generate a first frame and a second frame that both include one or more patches. The one or more patches included in the first frame represent the vertex coordinates of the 3D mesh and the one or more patches included in the second frame represent the vertex attribute of the 3D mesh. The processor is further configured to encode the first and second frames to generate a first bitstream. The processor is additionally configured to encode the connectivity information to generate a second bitstream. Additionally, the processor is configured to generate a compressed bitstream by multiplexing the first bitstream and the second bitstream. The communication interface is configured to transmit the compressed bitstream.

In yet another embodiment a method for mesh decoding is provided. The method for mesh decoding includes receiving a compressed bitstream. The method also includes separating, from the compressed bitstream, a first bitstream and a second bitstream. The method further includes decoding, from the second bitstream, connectivity information of a three dimensional (3D) mesh. The method additionally includes decoding, from the first bitstream, a first frame and a second frame that include patches. The patches included in the first frame represent vertex coordinates of the 3D mesh and the patches included in the second frame represent a vertex attribute of the 3D mesh. The method also includes reconstructing a point cloud based on the first and second frames. Additionally, the method also includes applying the connectivity information to the point cloud to reconstruct the 3D mesh.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as read-only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 4I illustrates an example portion of a mesh file in accordance with an embodiment of this disclosure;

FIGS. 5F, 5G, and 5H illustrate block diagrams of decoders in accordance with an embodiment of this disclosure;

DETAILED DESCRIPTION

Figure 1:
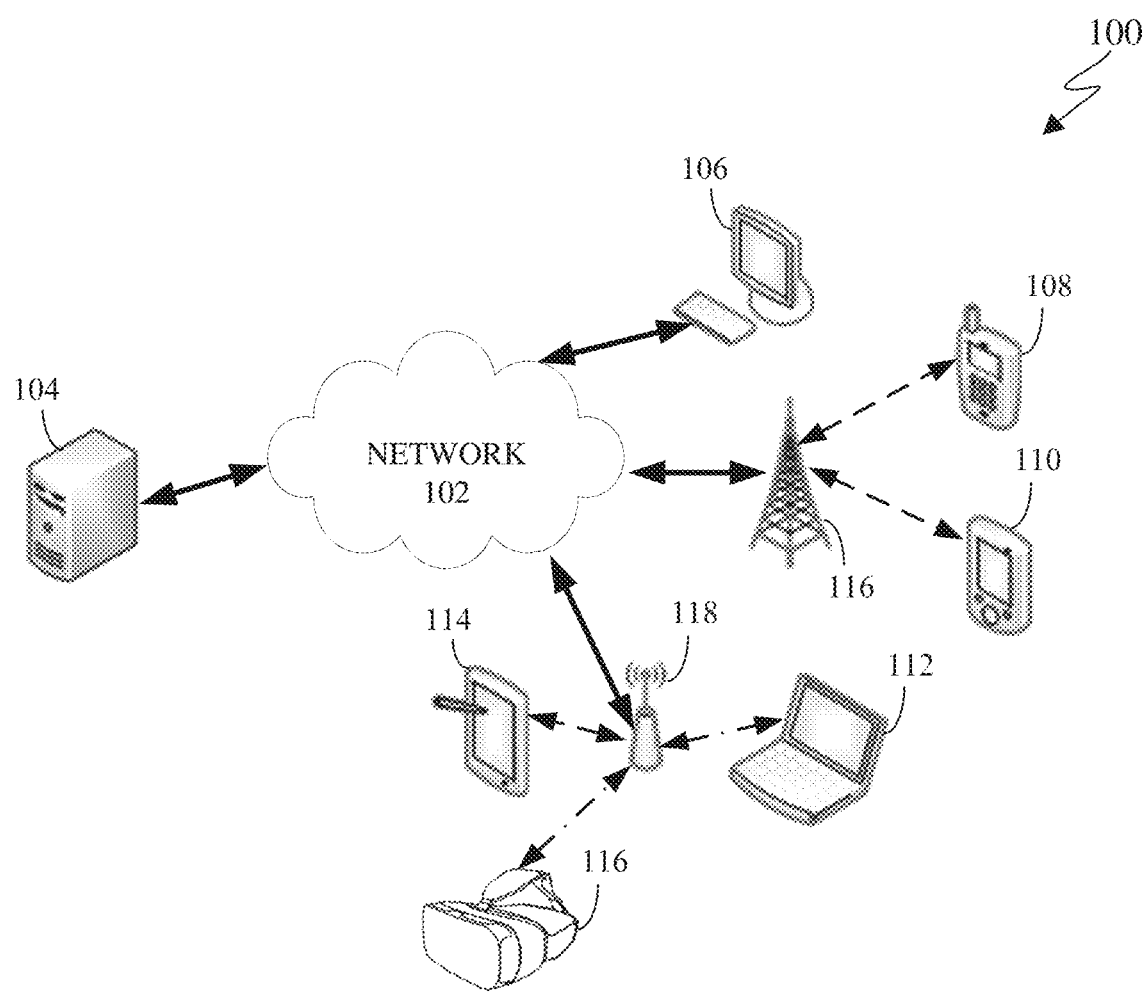
FIG. 1 illustrates an example communication system in accordance with an embodiment of this disclosure.

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

AR is an interactive experience of a real-world environment where objects that reside in the real-world environment are augmented with virtual objects, virtual information, or both. VR is a rendered version of a visual scene, where the entire scene is computer generated. MR is the combination of real and virtual worlds such that physical and digital objects coexist and interact in real-time. In certain embodiments, AR, VR, and MR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). A HMD represents one of many types of devices that provide AR and VR experiences to a user. A HMD is a device that enables a user to view the VR scene and adjust the displayed content based on movements of the head of the user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of individual points in 3D space, and each point is positioned in a particular geometric location within 3D space and includes one or more attributes such as color, texture, reflectance, and the like. Similarly, a mesh is a virtual representation of an object in three dimensions. For example, a mesh is a collection of vertices (which are similar to the points of a point cloud) and edges which form faces.

A point cloud and a mesh can be similar to a virtual object in a VR, AR, and MR environment. A point cloud or a mesh can be an object, multiple objects, a virtual scene (which includes multiple objects), and the like. Point clouds and meshes are commonly used in a variety of applications, including gaming, 3D mapping, visualization, medicine, AR, VR, autonomous driving, multi-view replay, 6 DoF immersive media, to name a few.

Figure 4C:
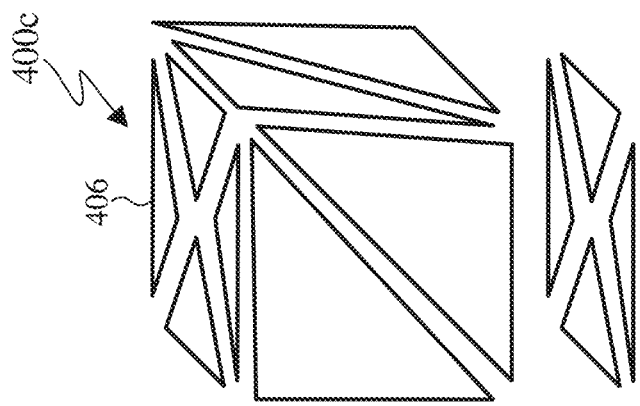
FIGS. 4A, 4B, and 4C illustrate the relationship between the components of a mesh in accordance with an embodiment of this disclosure.

Point clouds and meshes represent volumetric visual data. Point clouds consist of multiple points positioned in 3D space, where each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In some embodiments, the points are positioned on the external surface of the object. In other embodiments, the points are positioned throughout both the internal structure and external surface of the object. In yet other embodiments, the points are positioned along the surface of the object and can be positioned within the internal area of the point cloud. Similarly, a mesh includes multiple vertices which are similar to the points of a point cloud. FIG. 4A, described in greater detail below illustrates example vertices.

In addition to the geometric position of a point (the location of the point in 3D space), each point in the point cloud can also include attributes such as color (also referred to as texture), reflectance, intensity, surface normal, and the like. In some embodiments, a single point of a 3D point cloud can have multiple attributes. In some applications, point clouds can also be used to approximate light field data in which, each point includes multiple view-dependent, color information (R, G, B or Y, U, V triplets). Similarly, the faces of a mesh can include attributes such as color (also referred to as texture), reflectance, intensity, surface normal, and the like. In some embodiments, a single face of a mesh can include multiple attributes. FIG. 4C, described in greater detail below illustrates example faces.

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute that specifies the color of a single point can consume twenty-four bits. For instance, if a color component of a single point is defined based on a Red value, Green value, and Blue value, then each color component (Red, Green, and Blue) uses eight bits, totaling the twenty-four bits. As a result, a single point with a ten-bit geometric attribute data, per coordinate, and an eight-bit color attribute data, per color value, occupies fifty-four bits. Each additional attribute increases the bits required for a single point. If a frame includes one million points, the number of bits per frame is fifty-four million bits (fifty-four bits per point times one million points per frame). Additionally, the number of points, their positions, and their attributes may vary from one frame to another, such as when the object represented by the point cloud or mesh moves. If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission. It is noted that a mesh can include even more information than a point cloud, since the mesh comprises not only vertices (which are similar to the points of a point cloud), but also edges.

Embodiments of the present disclosure take into consideration that compressing a point clouds and meshes is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud or mesh; however such hardware components are often expensive. Additionally, many video codecs are not able to encode and decode 3D video content, such as a point cloud or mesh. Compressing and decompressing a point cloud or mesh by leveraging existing 2D video codecs enables the encoding and decoding of a point cloud or mesh to be widely available without the need for new or specialized hardware. According to embodiments of the present disclosure, leveraging existing video codecs can be used to compress and reconstruct a point cloud, when the point cloud is converted from a 3D representation to a 2D representation. Additionally, according to embodiments of the present disclosure, leveraging existing video codecs can be used to compress and reconstruct a mesh by separating the vertices information from the connectivity information of a mesh, such as the edges, faces and the like. The vertices information can then be encoded in a similar manner as a point cloud. In certain embodiments, the conversion of a point cloud or mesh from a 3D representation to a 2D representation includes projecting clusters of points (of a point cloud) or (vertices of a mesh) onto 2D frames by creating patches. Thereafter, video codecs such as HEVC, AVC, VP9, VP8, VVC, and the like can be used to compress the 2D frames representing in a similar manner to that of a 2D video.

To transmit a mesh from one device to another, the vertices of a mesh are represented as patches on 2D frames. The 2D frames can include projections of the mesh with respect to different projection planes. The frames can also represent different attributes of the mesh, such as one frame includes values representing geometry positions of the vertices and another frame includes values representing color information associated with each of the vertices. A decoder reconstructs the patches within the 2D frames into the mesh, such that the mesh can be rendered, displayed, and then viewed by a user. When the mesh is deconstructed to fit on multiple 2D frames and compressed, the frames can be transmitted using less bandwidth than used to transmit the original mesh. FIGS. 4E, 4F, and 4G, which are described in greater detail below, illustrate a mesh that is projected onto 2D frames by creating patches. FIG. 4H illustrates the process of projecting a mesh onto different planes.

Embodiments of the present disclosure provide systems and methods for converting a mesh into a 2D representation that can be transmitted and then reconstructed into the mesh for rendering. In certain embodiments, a mesh is deconstructed into multiple patches, and multiple frames are generated that include the patches. In certain embodiments, a frame includes patches of the same attributes. The vertices of the mesh that are represented in one patch in one frame correspond to the same vertices that are represented in another patch in a second frame when the two patches are positioned at the same coordinates. For example, a pixel at the position (u, v) in a frame that represents geometry is the geometry position of a pixel at the same (u, v) position in a frame that represents an attribute such as color. In other embodiments, the patches in one frame represent multiple attributes associated with the vertices of the mesh, such as a geometric position of the vertices in 3D space and color.

Embodiments of the present disclosure provide systems and methods for improving the compression and decompression of a mesh. For example, an encoder separates the vertices from the connectivity information of a mesh. The encoder groups (or clusters) the vertices with respect to different projection planes, and then stores the groups of vertices as patches on a 2D frames. The patches representing the geometry and attribute information are packed respectively into geometry video frames and attribute video frames, where each pixel within any of the patches corresponds to a vertex in 3D space. The geometry video frames are used to encode the geometry information, and the corresponding attribute video frames are used to encode the attribute (such as color) of the mesh. The two transverse coordinates (with respect to the projection plane) of a vertex corresponds to the column and row indices in the geometry video frame (u, v) plus a transverse-offset which determines the location of the entire patch within the video frame. The depth of the vertices is encoded as the value of the pixel in the video frame plus a depth-offset for the patch. The depth of the vertices depends on whether the projection of the 3D point cloud is taken from the XY, YZ, or XZ coordinates.

The 2D frames can be compressed by leveraging various video compression codecs, image compression codecs, or both. For example, the encoder first generates and then compresses the geometry frames using a 2D video codec such as HEVC. To encode an attribute frame (such as the color of the mesh), the encoder decodes the encoded geometry frame and which is used to reconstruct the 3D coordinates of the mesh. The encoder smooths the reconstructed vertices. Thereafter the encoder interpolates the color values of each vertex from the color values of input coordinates. The interpolated color values are then packed into a color frame which is compressed.

In certain embodiments, the encoder can also generate an occupancy map which shows the location of projected vertices in the 2D videos frames. The occupancy map frame can subsequently be compressed. The compressed geometry frames, the compressed color frames (and any other attribute frame), and the occupancy map frame can be multiplexed to generate a first bitstream.

The encoder that generated and compressed the frames can also encode the connectivity information to generate a second bitstream. In certain embodiments another encoder encodes the connectivity information. A bitstream is formed by multiplexing the first bitstream (representing the compressed geometry frames, the compressed attribute frame(s), and the occupancy map) and the second bitstream (representing the connectivity information). The encoder or another device then transmits the bitstream that includes the 2D frames to a different device.

A decoder receives the bitstream, decompresses the bitstream. The decoder reconstructs the vertices based on the information within the frames and applies the connectivity information to reconstruct the mesh. After the mesh is reconstructed, it can be rendered and displayed for a user to observe.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds or meshes. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a corresponding bitstream, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a mesh, compress the mesh, transmit the mesh, receive the mesh, render the mesh, or a combination thereof. For example, the server 104 receives a mesh, separates vertices from the connectivity information, decomposes the vertices to fit on 2D frames, compresses the frames and the connectivity information to generate a bitstream. The bitstream can be transmitted to a storage device, such as an information repository, or one or more of the client devices 106-116. For another example, one of the client devices 106-116 can receives a mesh, separates vertices from the connectivity information, decomposes the vertices to fit on 2D frames, compresses the frames and the connectivity information to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
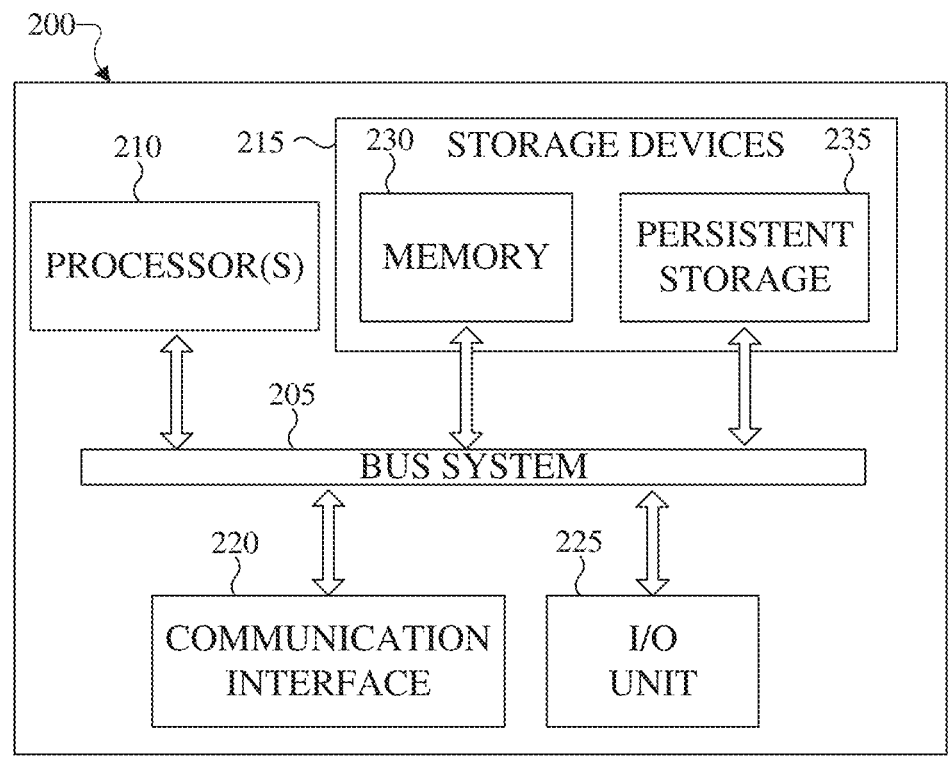
FIGS. 2 and 3 illustrate example electronic devices in accordance with an embodiment of this disclosure.
Figure 3:
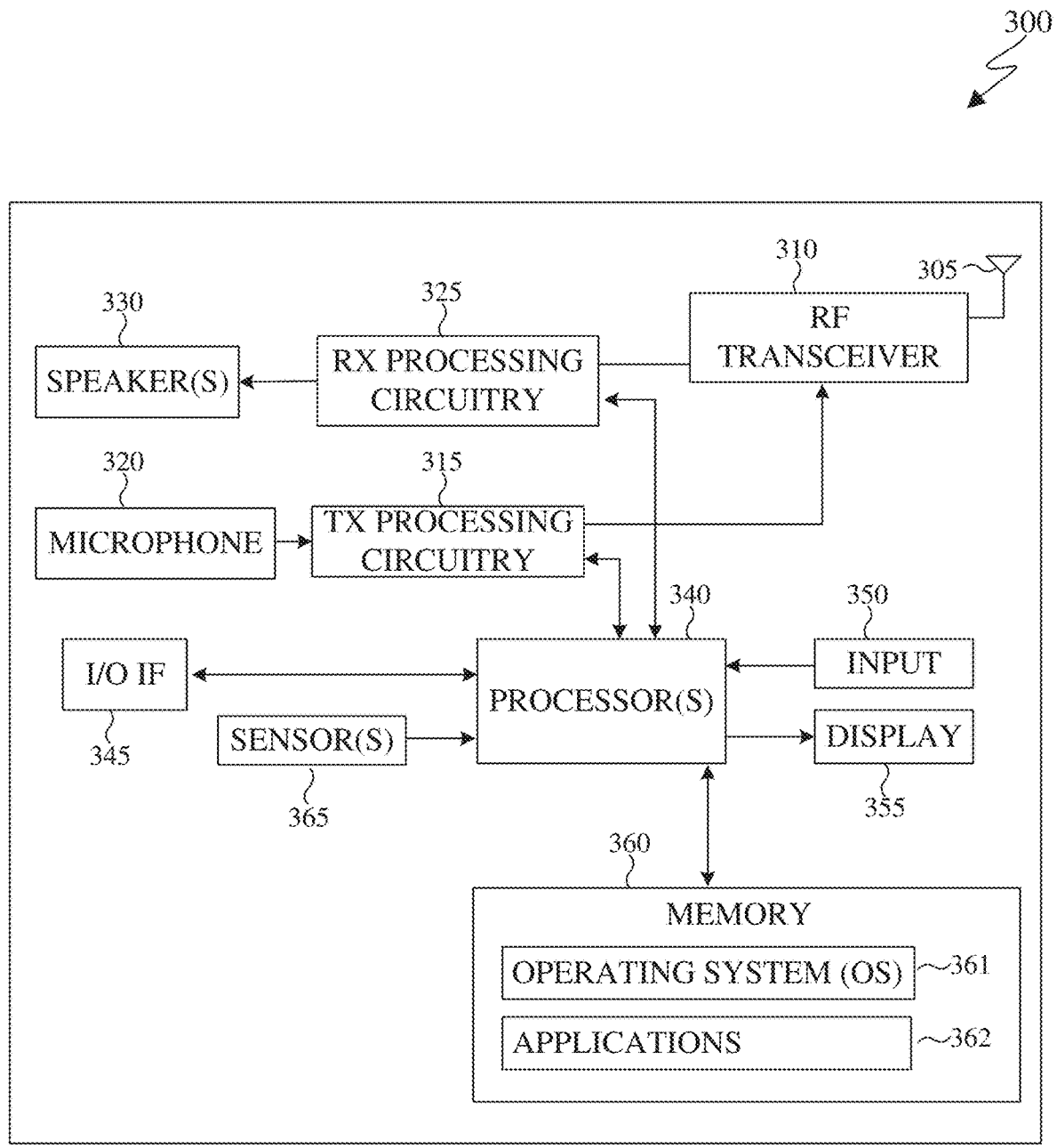

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field-programmable gate arrays, application-specific integrated circuits, and discrete circuitry. In certain embodiments, the processor 210 can encode a mesh stored within the storage devices 215. In certain embodiments, when the mesh is encoded by an encoder, the encoder also decodes the encoded mesh to ensure that when the mesh is reconstructed, the reconstructed mesh matches the original mesh.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for separating the vertices and the connectivity information, decomposing the vertices into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read-only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a mesh to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field-programmable gate arrays, application-specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, trackball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure-sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud and a mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read-only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye-tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud, a mesh, or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a mesh, the electronic device 300 can separate the vertices from the connectivity information. When the vertices and the connectivity information are separated, the vertices are similar to points of a point cloud. The electronic device 300 can also segment the vertices into multiple segments that form the patches that are presented in the 2D frame, via a point cloud encoder. For example, a cluster of vertices of the mesh can be smoothed and then be grouped together to generate a patch. A patch can represent a single aspect of the mesh, such as geometry (a geometric position of a vertex), or an attribute such as color, reflectance, and the like) that are associated with a vertex. Patches that represent the same attribute can be packed into the same 2D frame. The 2D frames are then encoded to generate a bitstream. Similarly, the connectivity information is also encoded to generate another bitstream. The two bitstreams can be multiplexed together and transmitted to another device as a single bitstream. During the encoding process additional content such as metadata, flags, occupancy maps, and the like can be included in any of the bitstreams.

Similarly, when decoding media content included in a bitstream that represents a mesh, the electronic device 300 separate's the received bitstream into encoded connectivity information and encoded vertex information. The bitstream can also include an occupancy map, frames, auxiliary information, and the like. A geometry frame can include pixels that indicate geographic coordinates of vertices in 3D space. Similarly, an attribute frame can include pixels that indicate the RGB (or YUV) color (or any other attribute) of each vertex in 3D space. The auxiliary information can include one or more flags, or quantization parameter size, one or more thresholds, or any combination thereof. After reconstructing the mesh, the electronic device 300 can render the mesh in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4B:
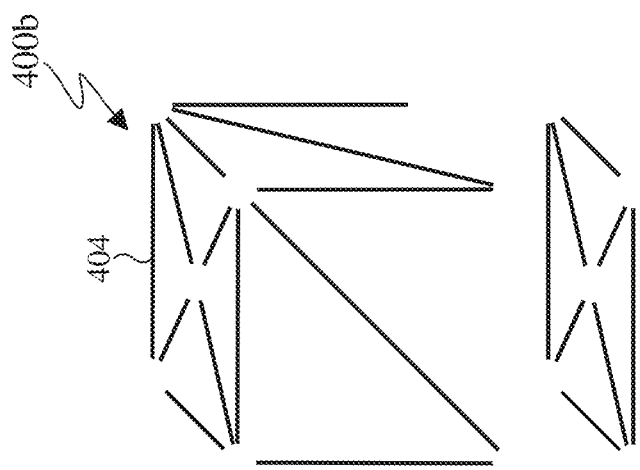
Figure 4A:
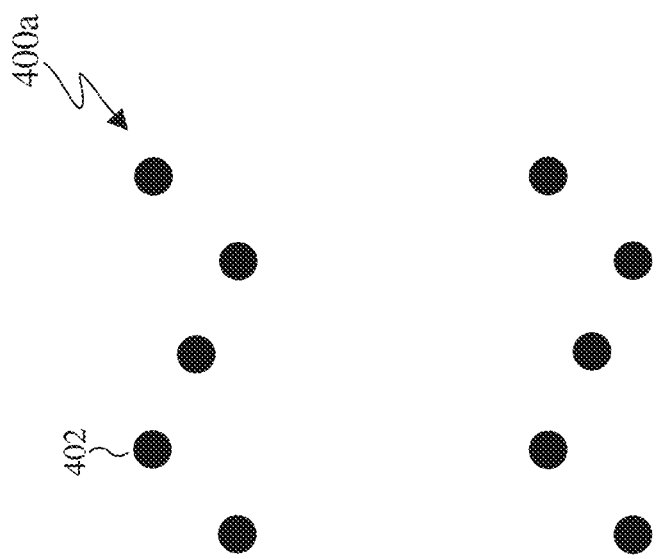

FIGS. 4A, 4B, and 4C illustrate the relationship between the components of a mesh in accordance with an embodiment of this disclosure. FIG. 4A illustrates the vertices 400a. A vertex, such as the vertex 402, is a geometric coordinate in 3D space. Each vertex is similar to a point of a 3D point cloud. FIG. 4B illustrates the edges 400b. An edge, such as the edge 404, is a connection between two of the vertices 400a. The edges represent the connectivity information of a mesh as they connect one vertex to another vertex. FIG. 4C illustrates the faces 400c. A face, such as the face 406, is a set of edges that when closed form a polygon. A face can represent connectivity information of a mesh as it is formed by connecting multiple vertices together. A triangle face 406, as is illustrated in FIG. 4C, is composed of three different edges. It is noted that a face can be a variety of polygons such as a quad face which is composed of four edges.

In certain embodiments, in addition to each vertex, such as the vertex 402, having a geometric location, each vertex can have one or more attributes. The attributes associated with a face can be a weighted combination of the attributes of the vertices that are connected to the edges which form the face.

Figure 4D:
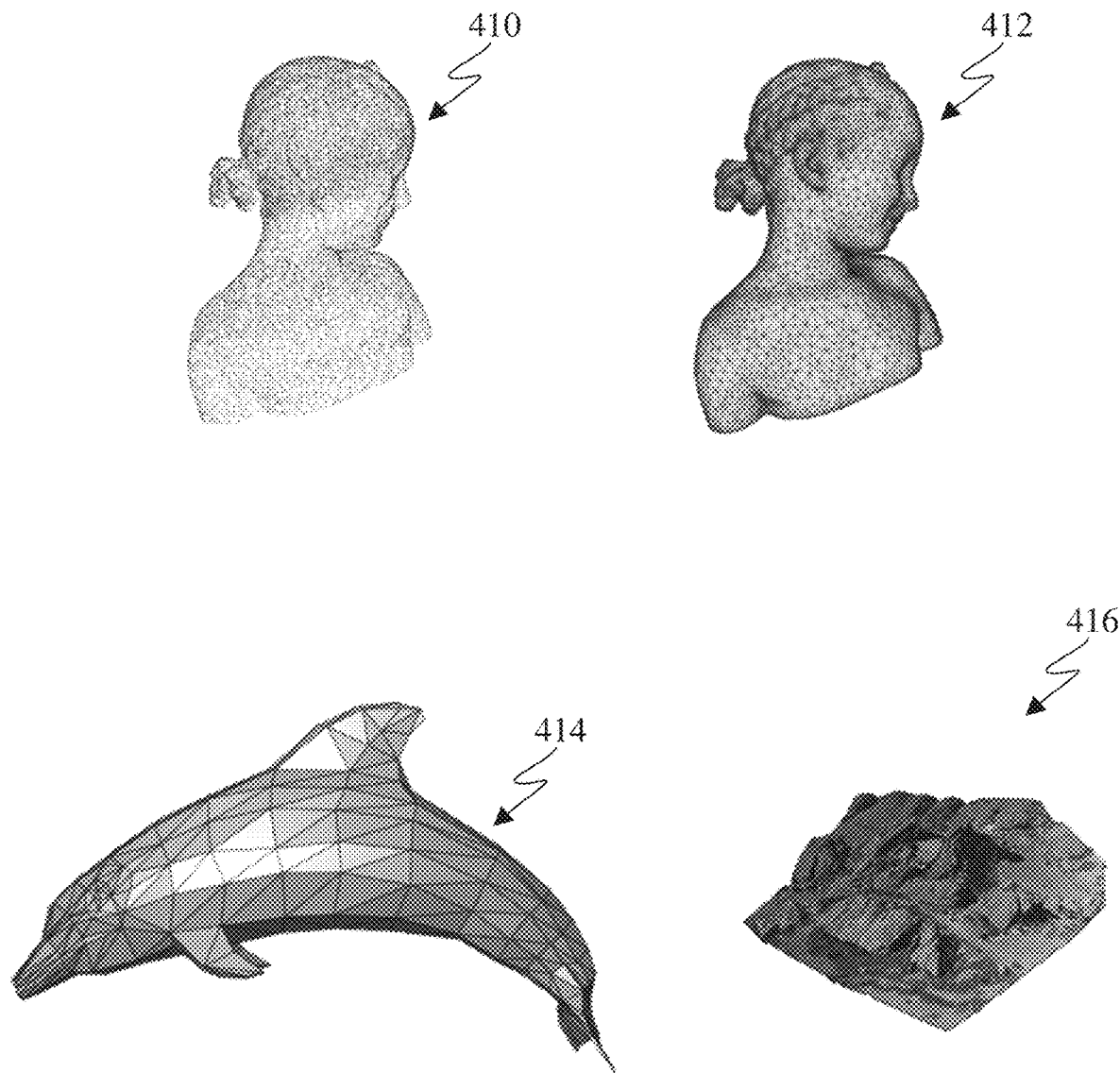
FIG. 4D illustrates example point clouds, point meshes and scenery in accordance with an embodiment of this disclosure.
Figure 4E:
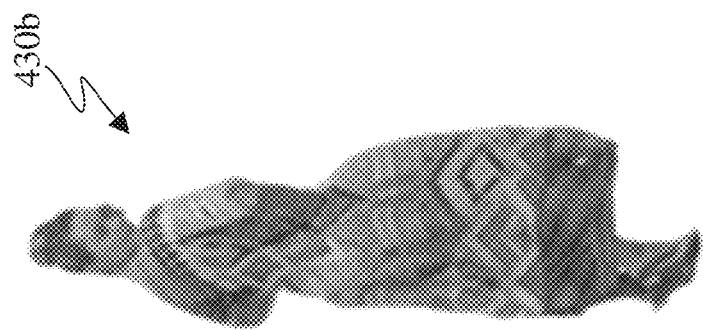
FIG. 4E illustrate an example 3D point cloud in accordance with an embodiment of this disclosure.
Figure 4E:
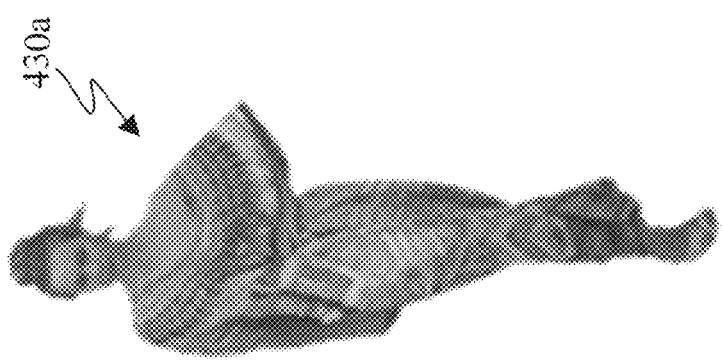
Figure 4F:
FIG. 4F illustrates example 2D frames that include patches representing the 3D point cloud of FIG. 4E in accordance with an embodiment of this disclosure.
Figure 4G:
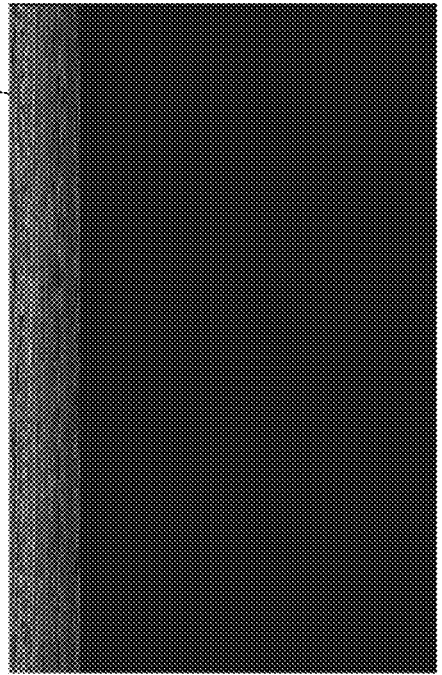
FIG. 4G illustrates an example 2D frame representing the 3D point cloud of FIG. 4E in accordance with an embodiment of this disclosure.
Figure 4G:
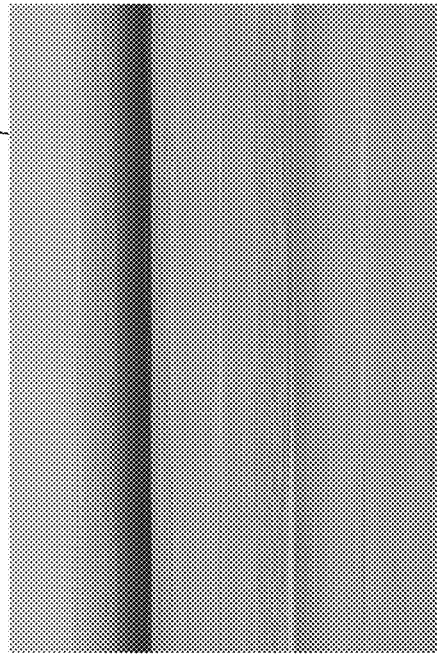
Figure 4H:
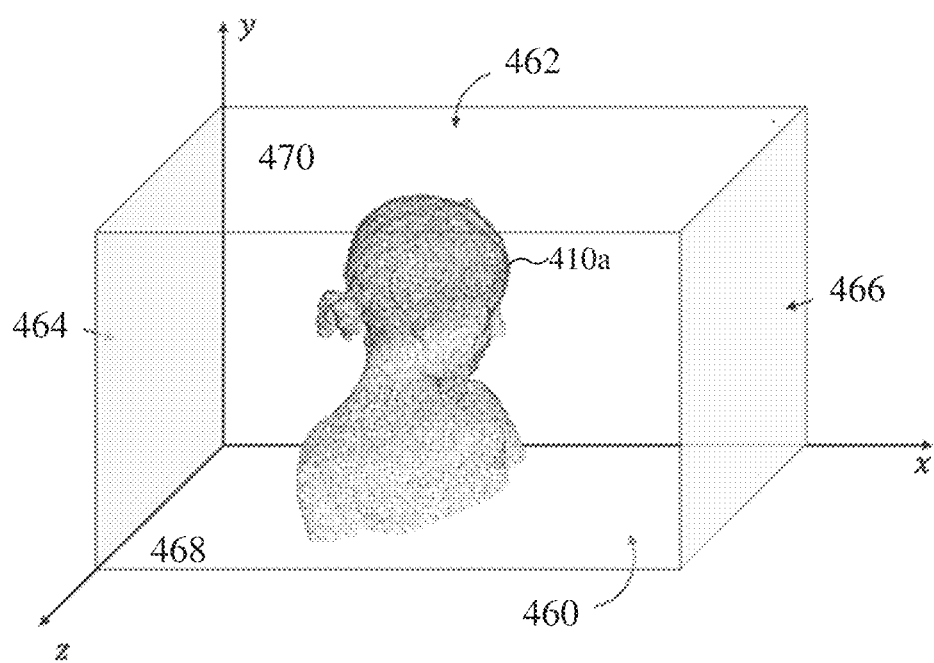
FIG. 4H illustrates a point cloud that is surrounded by multiple projection planes in accordance with an embodiment of this disclosure.

FIG. 4D illustrates example point clouds, meshes, and scenery in accordance with an embodiment of this disclosure. For example, FIG. 4D illustrates an example point cloud 410 and an example mesh 412 in accordance with an embodiment of this disclosure.

The point cloud 410 depicts an illustration of a point cloud. The point cloud 410 includes multiple points that visually define an object in 3D space. Each point of the point cloud 410 represents an external coordinate of the object, similar to a topographical map. Each point includes a geographical location and one or more attributes. The attributes of each point can also include texture, color, intensity, texture, motion, material properties, reflectiveness, and the like.

Similarly, the mesh 412 depicts an illustration of a 3D mesh. The mesh 412 illustrates the external structure of an object that is built out of polygons. For example, the mesh 412 is a collection of vertices (similar to the vertices 400a of FIG. 4A), edges (similar to the edges 400b of FIG. 4B), and faces (similar to the faces 400c of FIG. 4C) that define the shape of an object. The mesh 412 is defined by many polygonal or triangular interconnectivity of information between the various points. Each polygon of the mesh 412 represents the external surface of the object. The vertices of each polygon are similar to the points in the point cloud 410. Each polygon can include one or more attributes such as texture, color, intensity, texture, motion, material properties, reflectiveness, and the like.

The mesh 414 illustrates a triangular mesh. Triangular meshes are polygonal meshes in which the faces of the mesh are triangles similar to the face 406. The scenery 416 illustrates that a point cloud or point mesh can include multiple items or a scene instead of a solitary figure.

As discussed above, the data corresponding to a mesh and a point cloud are often too large to transmit to another without first compressing the data. During compression of a mesh, the vertex coordinates and attribute(s) are separated from the connectivity information, such as the edges. When the edges of a mesh are separated from the vertices, the vertices can be encoded in a similar manner as a point cloud. As such, to compress the mesh 412 of FIG. 4D the connectivity information is separated from the vertices yielding the point cloud 410 and the connectivity information. The vertices (also referred to as points of a point cloud) can be projected onto multiple projection planes to create patches.

FIGS. 4E, 4F, and 4G illustrate an example point cloud 430a and 430b (collectively point cloud 430) and frames 440, 445, 450, and 455 that represent the point cloud 430 in accordance with an embodiment of this disclosure. In particular, FIG. 4F illustrates the frames 440 and 450 that includes patches representing the point cloud 430 of FIG. 4E. Similarly, FIG. 4G illustrates the frames 445 and 455 that include a single raw patch representing the point cloud 430 of FIG. 4E.

The point cloud 430a and the point cloud 430b illustrate the same virtual object but viewed from different directions (points of view). As such, when the point cloud is represented on the frames 440 and 450, all 360° of the virtual object is present on the frames. It is noted that the point cloud 430 can be similar to any mesh that lacks its connectivity information.

The frame 440 represents the geometric position of points of the point cloud 430. As illustrated, the frame 440 includes multiple patches (such as a patch 442 and a raw patch 444). The patch 442 represents the depth values of multiple vertices, while the raw patch 444 represents all of the geometric coordinates of particular vertices of the point cloud 430. It is noted that the patch 442 preserve the shape of the input mesh while the raw patch 444 does not preserve the shape of the input mesh. The value of each pixel in the patch 442 is represented as a lighter or darker color and corresponds to a distance each pixel is from the projection plane. When projecting the point cloud 430 onto the 2D frames various patches are generated such as the patch 442, while other vertices are inadvertently missed and not included in any of the patches within the frame 440. As such, the raw patch 444 includes the geometric coordinates of any vertex which is not included in any of the patches. The raw patch 444 explicitly signals X, Y, Z geometry coordinates of certain point, such that the points can be packed into the raw patch 444 in any arbitrary order. A raw patch can take any visual form since the values (such as a geometric coordinates or color values) are simply packed into a patch. In certain embodiments, a raw patch is rectangular can stretch the length of a frame, as shown in FIGS. 4F and 4G. In contrast the pixels of the patch 442 are packed in a particular order based on projecting the point cloud onto different projection planes. There may be other types of patches different than a patch 442 and raw patches 444, such as patches created by projecting multiple points into a single pixel at the same time in frame 440. It is noted that this disclosure considers patches created by projecting multiple points into a single pixel as a patch 442. The patch 442 is also called a regular patch.

Similarly, the frame 450 that represents the color (or another attribute) associated with points of the point cloud 430. As illustrated, the frame 450 includes multiple patches (such as a patch 452 and a raw patch 454). The patch 452 represents the color values of multiple vertices, while the raw patch 454 represents the colors of particular vertices of the point cloud 430. It is noted that the patch 452 preserve the shape of the input mesh, while the raw patch 454 does not preserve the shape of the input mesh When projecting the point cloud 430 onto the 2D frames various patches are generated such as the patch 452, while other vertices are inadvertently missed and not included in any of the patches within the frame 450. As such, the raw patch 454 includes the color values of any vertex which is not included in any of the patches. There might be other types of patches different than a patch 452 and raw patches 454, such as patches created by projecting multiple points into a single pixel at the same time in frame 450, but this disclosure considers this type of a patch as a patch 452. The patch 452 is also called a regular patch.

Each pixel of color in the frame 450 corresponds to a particular geometry pixel in the frame 440. For example, a mapping is generated between each pixel in the frame 440 and the frame 450. The location of the patches within the 2D frames 440 and 450 can be similar for a single position of the 3D point cloud. As shown in the frames 440 and 450, some of the pixels correspond to valid pixels that represent the point cloud 430 while other pixels (the black area in the background) correspond to invalid pixels that do not represent any aspect of the point cloud 430. In some embodiments, not illustrated in the frames 440 and 450 the invalid pixels that do not represent any aspect of the point cloud 430 can include padding which softens the edges of the patches to increase the compression efficiency.

The frame 445 of FIG. 4G represents the geometry of the point cloud 430 and the frame 455 of FIG. 4G represent represents the color (or another attribute) associated with points of the point cloud 430. The frame 445 is similar to the frame 440 as each frame represents geometry the point cloud 430. Similarly, the frame 455 is similar to the frame 450 as each frame represents an attribute, such as color, of the point cloud 430. However, the frames 445 and 455 include a single raw patch instead of the multiple patches as illustrated in the frames of FIG. 4F. The single raw patch of the frame 445 represents a list of the geometry coordinates of each vertex of the point cloud 430, while the single raw patch of the frame 455 represents a list of the color values of each vertex of the point cloud 430.

In certain embodiments, a point cloud encoder generates multiple frames such as the frames 440 and 450 when compressing the point cloud 430. In certain embodiments, a point cloud encoder generates multiple frames such as the frames 445 and 455 when compressing the point cloud 430. In other embodiments, a point cloud encoder generates both types of frames (such as the frames 440 and 445 as well as 450 and 455) when compressing the point cloud 430.

FIG. 4H illustrates a point cloud 410*a* and multiple projection planes. The point cloud 410*a* can is similar to the point cloud 410 of FIG. 4D as well as the mesh 412 of FIG. 4D (since the point cloud 410 can be the mesh 412 without the connectivity information). The point cloud 410*a* is surrounded by multiple projection planes, such as the projection plane 460, 462, 464, 466, 468, and 470. The projection plane 460 is separated from the projection plane 462 by a predefined distance. For example, the projection plane 460 corresponds to the projection plane XZ0 and the projection plane 462 corresponds to the projection plane XZ1. Similarly, the projection plane 464 is separated from the projection plane 466 by a predefined distance. For example, the projection plane 464 corresponds to the projection plane YZ0 and the projection plane 466 corresponds to the projection plane YZ1. Additionally, the projection plane 468 is separated from the projection plane 470 by a predefined distance. For example, the projection plane 468 corresponds to the projection plane XY0 and the projection plane 470 corresponds to the projection plane XY1. It is noted that additional projection planes can be included and the shape of that the projection planes form can differ. The point cloud 410*a* is then projected onto the multiple projection planes 460, 462, 464, 466, 468, and 470. To generate the patches 442 and 452 of the frames 440 and 450 respectively.

Figure 4I:
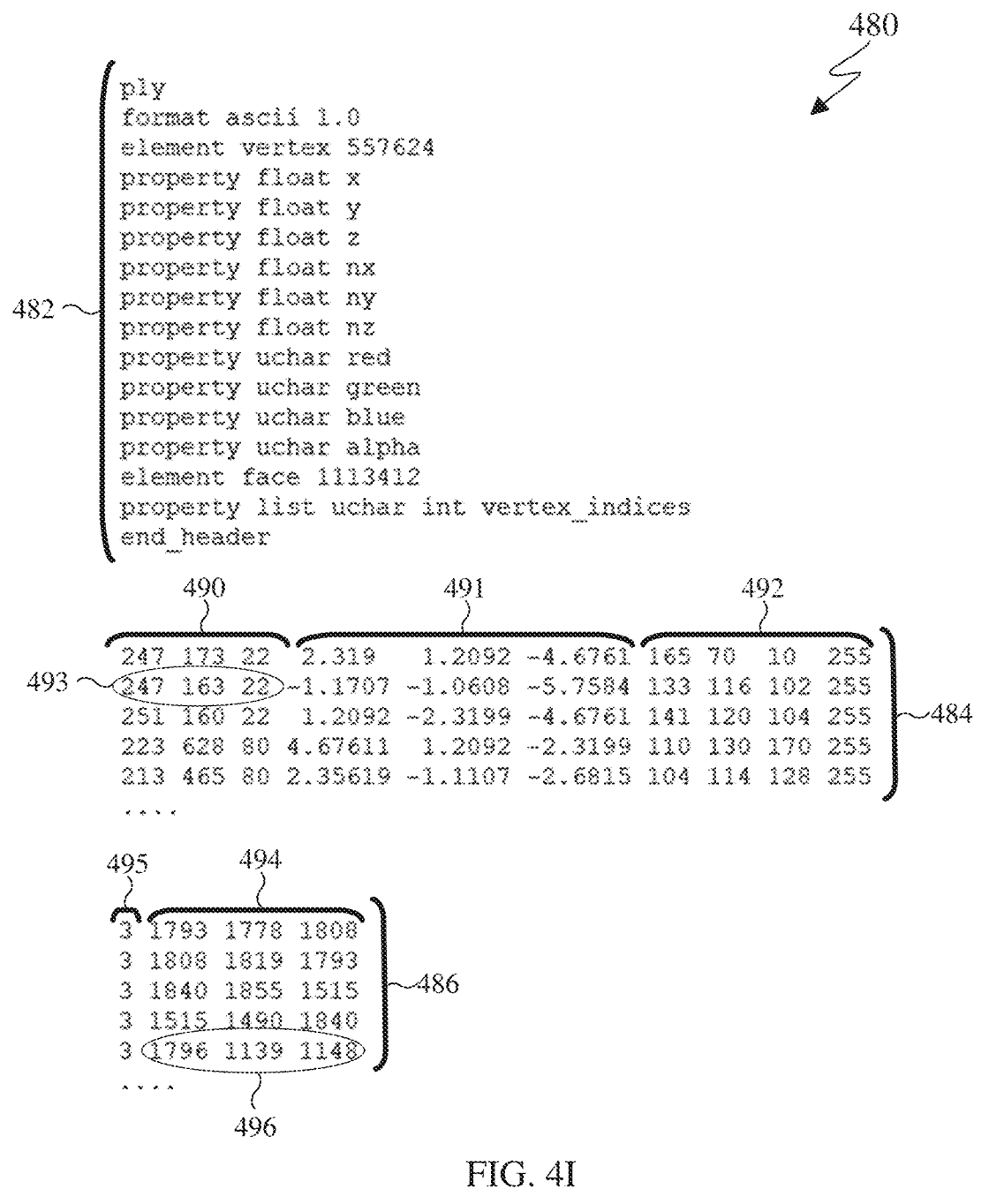

FIG. 4I illustrates an example portion of a mesh file 480 in accordance with an embodiment of this disclosure. The mesh file 480, which describes a mesh, includes a header 482, vertex information 484, and face information 486.

The vertex information 484 is an index that lists information about each vertex of the mesh. Each row of the vertex information 484 describes a different vertex of the mesh. Each of the vertices (each row of the vertex information 484) can include an index number (not illustrated) that identifies each particular vertex of the mesh and is used to relate each vertex to a face that is described the face information 486.

The vertex information 484 includes a list of the coordinates 490, the normal 491, and the color 492 that is associated with each vertex of the mesh. The coordinates 490 lists the coordinates, such as the coordinates 493 for each vertex. A vertex described by the coordinates 493 can be similar to the vertex 402 of FIG. 4A. For example, the vertex described by the coordinates 493, is located in 3D space at the (247, 163, 22) corresponding to (X, Y, Z) coordinate location. The vertex described by the coordinates 493 includes two attributes that of normal 491 and color 492. It is noted that in other meshes, more or less attributes can be included. The vertex described by coordinates 493 can include a normal position such as (−1.170, −1.0608, −5.7584), corresponding to (NX, NY, NZ). The vertex described by coordinates 493 can include the color (133, 116, 102) corresponding to (red, green, blue). The number 255 indicates the number of colors between 0 and 255.

The face information 486 is an index that lists information about each of the faces of the mesh. Each row of the face information 486 describes a different face of the mesh. In certain embodiments, each of the faces (each row of the face information 486) can include an index number (not illustrated) that identifies each particular face of the mesh.

The face information 486 specifies the number of edges 495 that form each face of the mesh and the particular vertex indices 494 that comprise each face. The number of edges 495 indicates how many edges form a particular face of the mesh. As illustrated, each face includes three edges. It is noted that each of the faces (each row of the face information 486) is described by the index of three separate vertices, such as the three indices 496. For example, a vertex with the index number 1148 can be the vertex described by the coordinates 493. The index number 1148 corresponds to one of three vertices (indicated by the three indices 496) that describe a particular face of the mesh. The index numbers 1796 and 1139 correspond to different vertices that are included the vertex information 484.

As discussed in greater detail below, to compress and transmit a mesh, the connectivity information can be separated from the vertex information. Therefore, Embodiments of the present disclosure maintain a relationship between the index number of each vertex and the index number of each face, since each face is defined by the particular vertices.

Although FIGS. 4A, 4B, 4C, 4D, 4E, 4F, 4G, 4H, and 4I illustrate example point clouds, meshes, and 2D frames various changes can be made to FIGS. 4A, 4B, 4C, 4D, 4E, 4F, 4G, 4H, and 4I. For example, the patches included in the 2D frames can represent other attributes, such as luminance, material, and the like. FIGS. 4A, 4B, 4C, 4D, 4E, 4F, 4G, 4H, and 4I do not limit this disclosure to any particular 3D object(s) and 2D frames representing the 3D object(s).

Figure 5A:
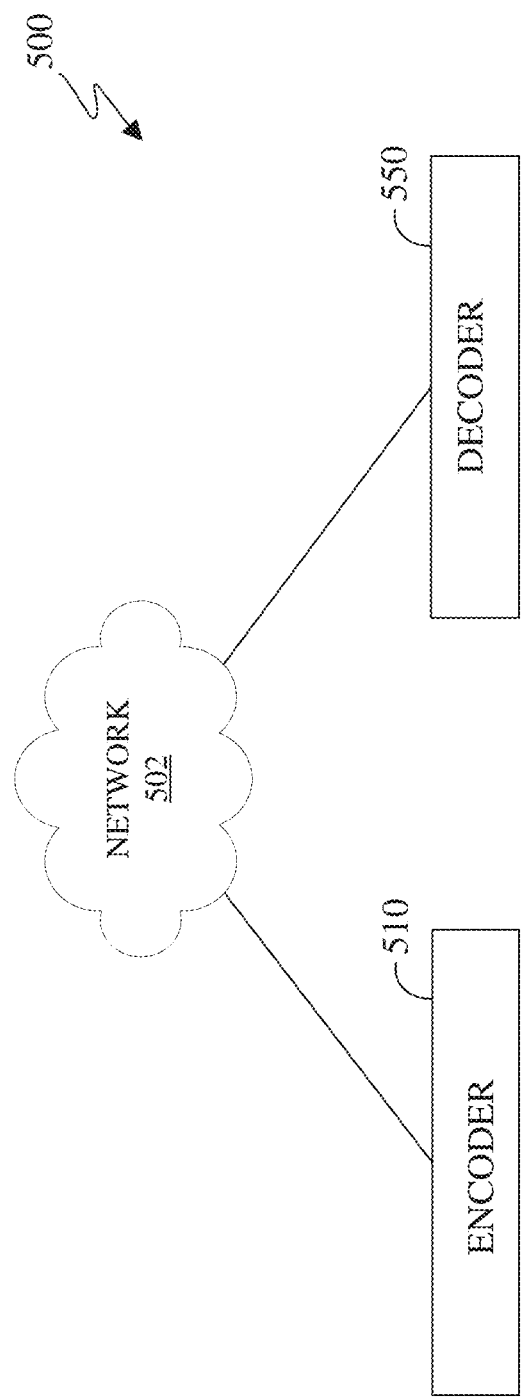
FIG. 5A illustrates a block diagram of an example environment-architecture in accordance with an embodiment of this disclosure.

FIGS. 5A, 5B, 5C, 5E, 5F, 5G, 5H, 6A, 6B, and 6C illustrate block diagrams in accordance with an embodiment of this disclosure. In particular, FIG. 5A illustrates a block diagram of an example environment-architecture 500 in accordance with an embodiment of this disclosure. The FIGS. 5B, 5C, 5D, 6A, and 6B illustrate example block diagrams of the encoder 510 of FIG. 5A. The FIGS. 5F, 5G, 5H, and 6C illustrate example block diagrams of the decoder 550 of FIG. 5A. FIG. 5D illustrates example indexes in accordance with an embodiment of this disclosure. The embodiments of FIGS. 5A through 6C are for illustration only. Other embodiments can be used without departing from the scope of this disclosure.

As shown in FIG. 5A, the example environment-architecture 500 includes an encoder 510 and a decoder 550 in communication over a network 502. The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, or another suitable device, and include internal components similar to that of the server 200 of FIG. 2 and the electronic device 300 of FIG. 3. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device that includes a display. In certain embodiments, the encoder 510 and the decoder 550 are the same device or operably connected to the same device.

The encoder 510 is described with more below in FIGS. 5B, 5C, 5E, 6A, and 6B. Generally, the encoder 510 receives 3D media content, such as a mesh, from another device such as a server (similar to the server 104 of FIG. 1, the server 200 of FIG. 2) or an information repository (such as a database), or one of the client devices 106-116. In certain embodiments, the encoder 510 can receive media content from multiple cameras and stitch the content together to generate a 3D scene that includes one or more point clouds.

In certain embodiments, the encoder 510 can include two separate encoders a connectivity encoder and a point cloud encoder that is configured to encode a point cloud using a video encoder. The encoder 510 demultiplexes, or separates, the vertex information (vertex coordinates and vertex attribute(s)) from the vertex connectivity information. The vertex information is similar to a point cloud, such as the point cloud 410 of FIG. 4D.

The connectivity encoder encodes the connectivity information of the mesh. In certain embodiments, the connectivity encoder can be similar to a Triangle-FAN (TFAN) encoder, an Edgebreaker encoder or the like. The point cloud encoder encodes the vertex information such as the vertex coordinates and the vertex attributes.

The point cloud encoder projects the vertices of the mesh onto different planes such as an XY plane, a YZ plane, and an XZ plane, to create patches. When a vertex is projected onto a 2D frame, it is denoted as a pixel and identified by the column and row index in the frame indicated by the coordinate (u, v), instead of the (X, Y, Z) coordinate value of the vertex in 3D space. Additionally, 'u' and 'v' can range from zero to the number of rows or columns in the projected 2D image, respectively. The point cloud encoder 510 packs the patches representing the geometry of the vertices onto 2D video frames, and thereafter encodes the frames. It is noted that most of the vertex coordinates are projected onto the regular patches (such as the patch 442 of FIG. 4F) while some of the vertex coordinates could be projected onto the raw patches (such as the raw patch 444 of FIG. 4F).

In certain embodiments, the point cloud encoder also generates an occupancy map based on the geometry frame(s) to indicate which pixels within the frames are valid. Generally, the occupancy map indicates, for each pixel within a geometry frame, whether the pixel is a valid pixel or an invalid pixel. For example, if a pixel in the occupancy map at coordinate (u, v) is valid, then the corresponding pixel in a geometry frame at the coordinate (u, v) is also valid. If the pixel in the occupancy map at coordinate (u, v) is invalid, then the decoder 550 skips the corresponding pixel in the geometry frames at the coordinate (u, v). In certain embodiments, the occupancy map is binary, such that the value of each pixel is one or zero. For example, when the value of a pixel at position (u, v) of the occupancy map is one indicates that a pixel at (u, v) of the geometry frame is valid. In contrast, when the value of a pixel at position (u, v) of the occupancy map is zero indicates that a pixel at (u, v) of the geometry frame is invalid.

The point cloud encoder can compress both a geometry frame and a corresponding occupancy map frame. Thereafter the point cloud encoder can decode and reconstruct the geometry frames and the occupancy map frames. The reconstructed geometry and occupancy map frames are used to generate the one or more attribute frames. After generating the attribute frames, the attribute frames are compressed. The encoder 510 then multiplexes the encoded connectivity information with the encoded frames to generate a bitstream that can be transmitted to another device via the network 502.

The decoder 550, which is described with more below in FIGS. 5F, 5G, 5H, and 6C, receives a bitstream that represents media content. The bitstreams can include two separate bitstreams that are multiplexed together such as the connectivity information and the vertex coordinates and attribute(s). The decoder 550 can include two decoders, a point cloud decoder configured to decode a point cloud using a video decoder and a connectivity decoder. The point cloud decoder can decode multiple frames such as the geometry frame, the one or more attribute frames, and the occupancy map. The connectivity decoder decodes the connectivity information. The decoder 550 then reconstructs the mesh from the multiple frames and the connectivity information. The reconstructed mesh can then be rendered and viewed by a user.

Figure 5B:
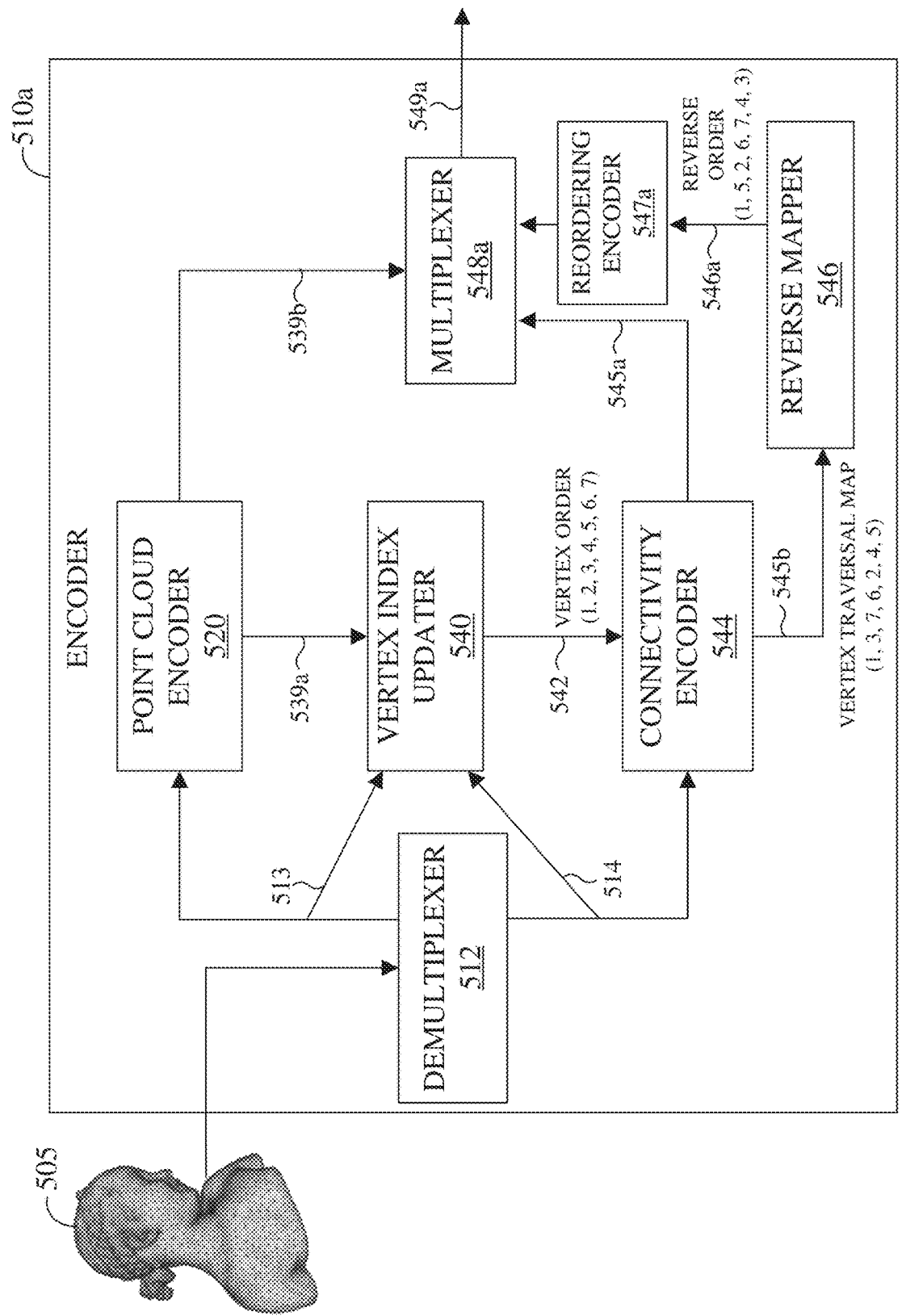
FIGS. 5B and 5C illustrate block diagrams of encoders in accordance with an embodiment of this disclosure.
Figure 5C:
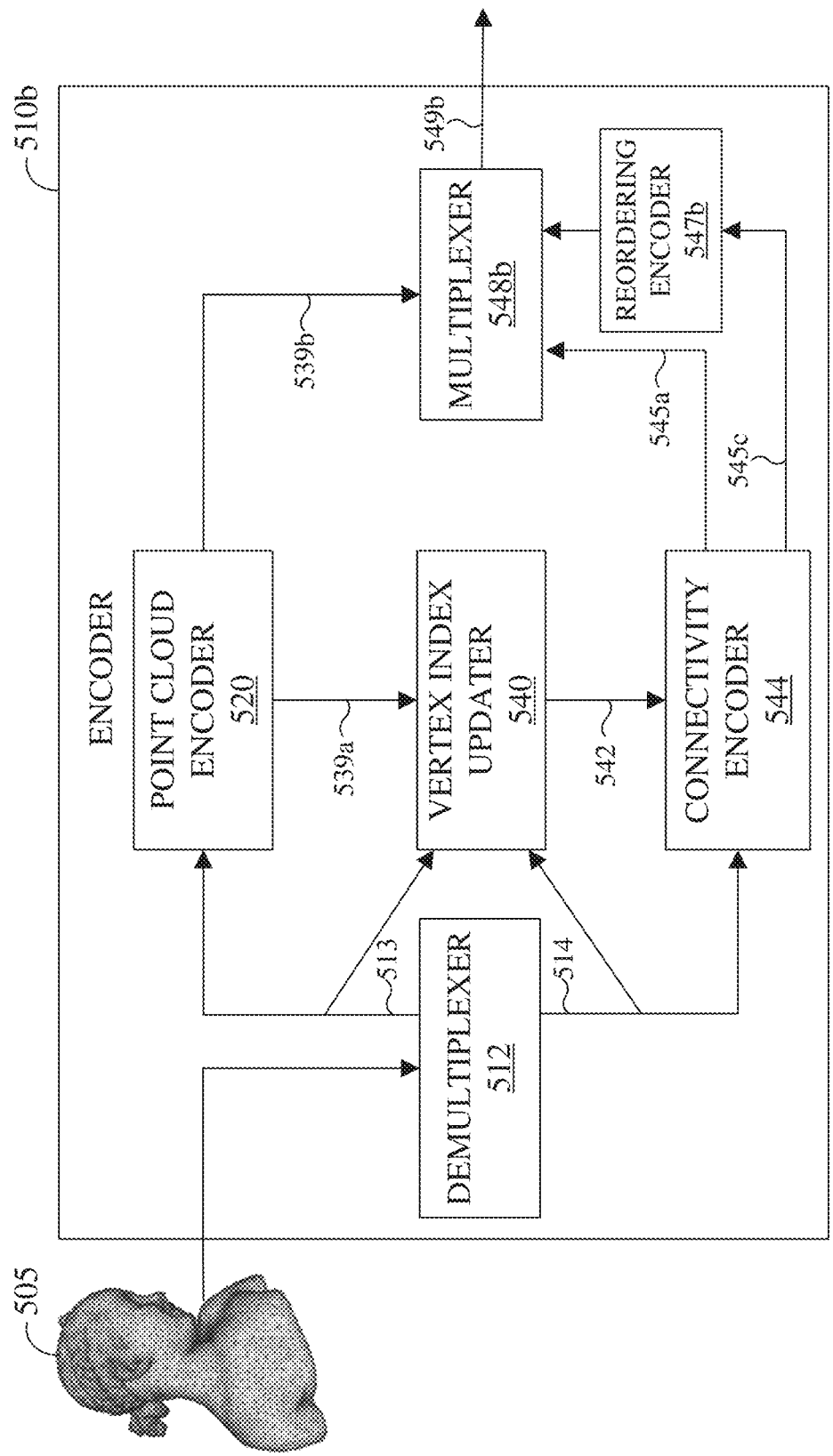
Figure 5D:
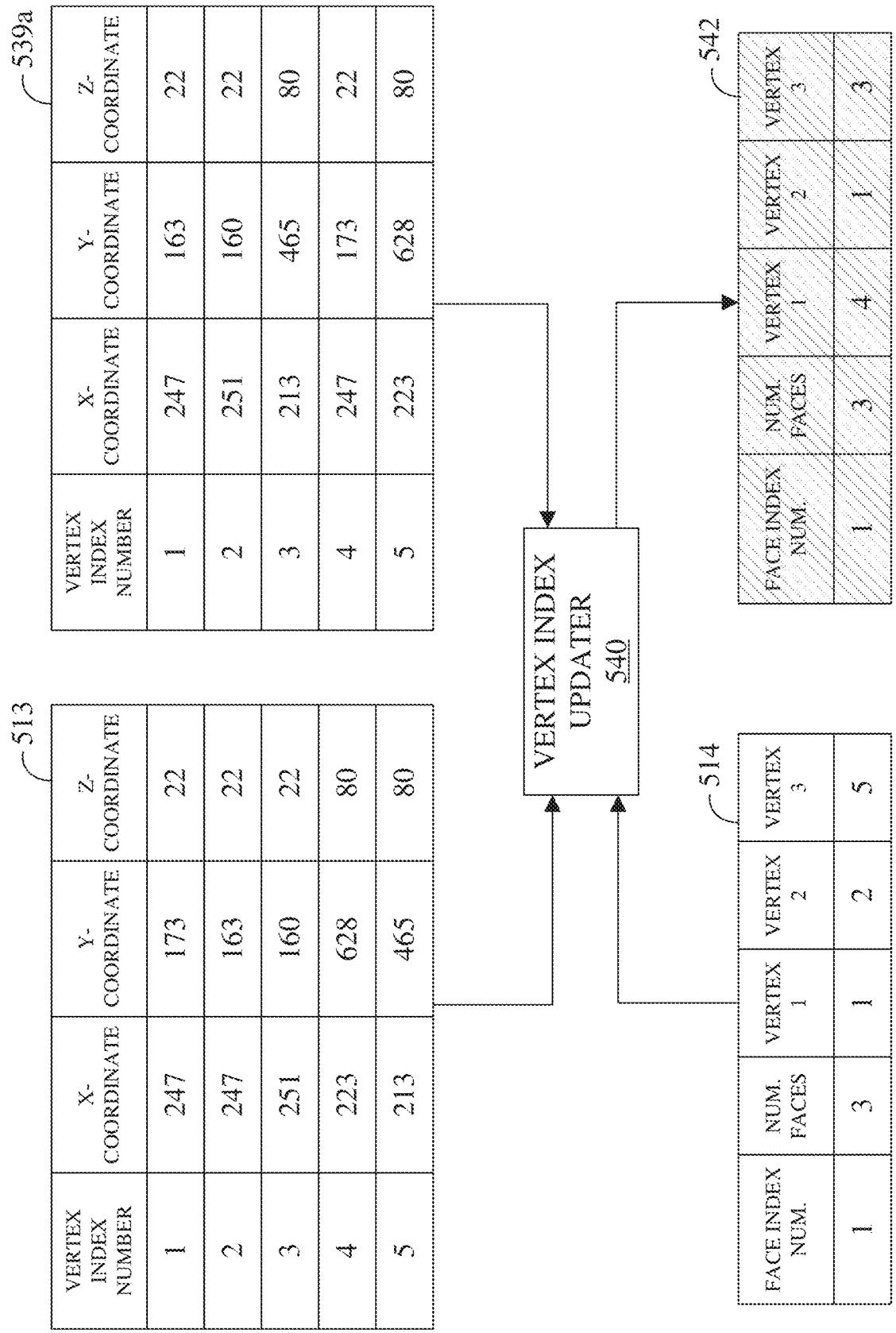
FIG. 5D illustrates example indexes in accordance with an embodiment of this disclosure.

FIG. 5B illustrates a block diagram of the encoder 510*a*. Similarly, FIG. 5C illustrates a block diagram of the encoder 510*b*. The encoders 510*a* and 510*b* are similar to the encoder 510 of FIG. 5A. The encoders 510*a* and 510*b* receive a mesh 505. The encoder 510*a* generates a bitstream 549*a* while the encoder 510*b* generates a bitstream 549*b*. The bitstreams 549*a* and 549*b* include data representing the mesh 505. The bitstreams 549*a* and 549*b* can include multiple bitstreams and can be transmitted via the network 502 of FIG. 5A to another device, such as the decoder 550 or an information repository. The encoder 510*a* includes a demultiplexer 512, a point cloud encoder 520, a vertex index updater 540, a connectivity encoder 544, a reverse mapper 546, a reordering encoder 547*a*, and a multiplexer 548*a*. The encoder 510*b* includes a patch a demultiplexer 512, a point cloud encoder 520, a vertex index updater 540, a connectivity encoder 544, a reordering encoder 547*b*, and a multiplexer 548*b*.

The encoder 510*a* of FIG. 5B is similar to the encoder 510*b* of FIG. 5C. However, the encoder 510*a* generates and encodes the reverse vertex traversal map while the encoder 510*b* generates and encodes the traversal map. Since the encoder 510*a* generates the reverse vertex traversal map, the decoder 550*a* of FIG. 5F decodes and reconstructs the mesh 595. In contrast, since the encoder 510*b* generates the reverse vertex traversal map, the decoder 550*b* of FIG. 5G decodes and reconstructs the mesh 595. The reconstructed meshes in FIG. 5F and FIG. 5G are identical.

The mesh 505, of FIGS. 5B and 5C, can be stored in memory (not shown) or received from another electronic device (not shown). The mesh 505 can be a single 3D object (similar to the mesh 412, and 414 of FIG. 4D as well as the point cloud 430*a* and 430*b* of FIG. 4E), or a scenery (similar to the 416 of FIG. 4D). The mesh 505 can be a stationary object or an object which moves.

The demultiplexer 512, of FIGS. 5B and 5C, separates the connectivity information 514 of the mesh 505 from the vertex coordinates and attribute information 513. The connectivity information 514 relates one vertex to another such as the face information 486 of FIG. 4I while the vertex coordinates and attribute information 513 can include the vertex information 484 of FIG. 4I.

The point cloud encoder 520, of FIGS. 5B and 5C, encodes the vertex coordinates and attribute information 513 to generate reconstructed vertices 539a and a bitstream 539b. To generate the reconstructed vertices 539a and a bitstream 539b, the point cloud encoder 520 segments the vertex coordinates (geometry) into patches (such as the patch 442 of FIG. 4F). The point cloud encoder 520 then packs the patches into 2D geometry video frames (such as the frame 440 of FIG. 4F). The point cloud encoder 520 then compresses the geometry video frame using a 2D video codec such as HEVC. In certain embodiments, the point cloud encoder 520 encodes the vertices in the order that they are packed into the frames, which can be different than the order of the connectivity information 514.

In certain embodiments, the point cloud encoder 520 fills the area between the patches of the geometry video frame with padding before the frame is compressed. Filling the area between patches with padding reduces the compression bitrate. In certain embodiments, the point cloud encoder 520 does not fill the area between the patches of the geometry video frame.

To encode the vertex attributes (such as the color, the normal, the material property, reflectance etc. of each vertex), the point cloud encoder 520 first decodes the encoded geometry video frames and then reconstructs the 3D coordinates. After reconstructing the geometry coordinates, the point cloud encoder 520 interpolates the color values for each reconstructed vertex from the color values of the vertices of the mesh 505, since the geometric coordinates of each vertex can shift when the point cloud is reconstructed. The point cloud encoder 520 then packs the generated colors into a 2D attribute video frame and then compresses the attribute video frame using a 2D video codec such as HEVC. A mapping exists between the pixels of the geometry video frame and the attribute video frame.

In certain embodiments, the point cloud encoder 520 smooths the reconstructed geometry coordinates before interpolating the color values for each reconstructed vertex. In certain embodiments, smoothing the reconstructed geometry coordinates is not performed. In certain embodiments, the point cloud encoder 520 fills the area between the patches of the attribute video frame with padding before the frame is compressed. Filling the area between patches with padding reduces the compression bitrate. In certain embodiments, the point cloud encoder 520 does fill the area between the patches of the attribute video frame.

In certain embodiments, the point cloud encoder 520 can compare the geometry coordinates of each reconstructed vertex to the geometry coordinates of the mesh 505. For each missing point (vertex) of the reconstructed point cloud, the point cloud encoder 520 identifies the geometry position of that point and includes that information in a raw points patch (such as the raw patch 444 of FIG. 4F). Similarly, the point cloud encoder 520 identifies the corresponding color (and any other attribute value) of the missing point and interpolates the new color value and includes that information in the raw points patch (such as the raw patch 454 of FIG. 4F).

Figure 6A:
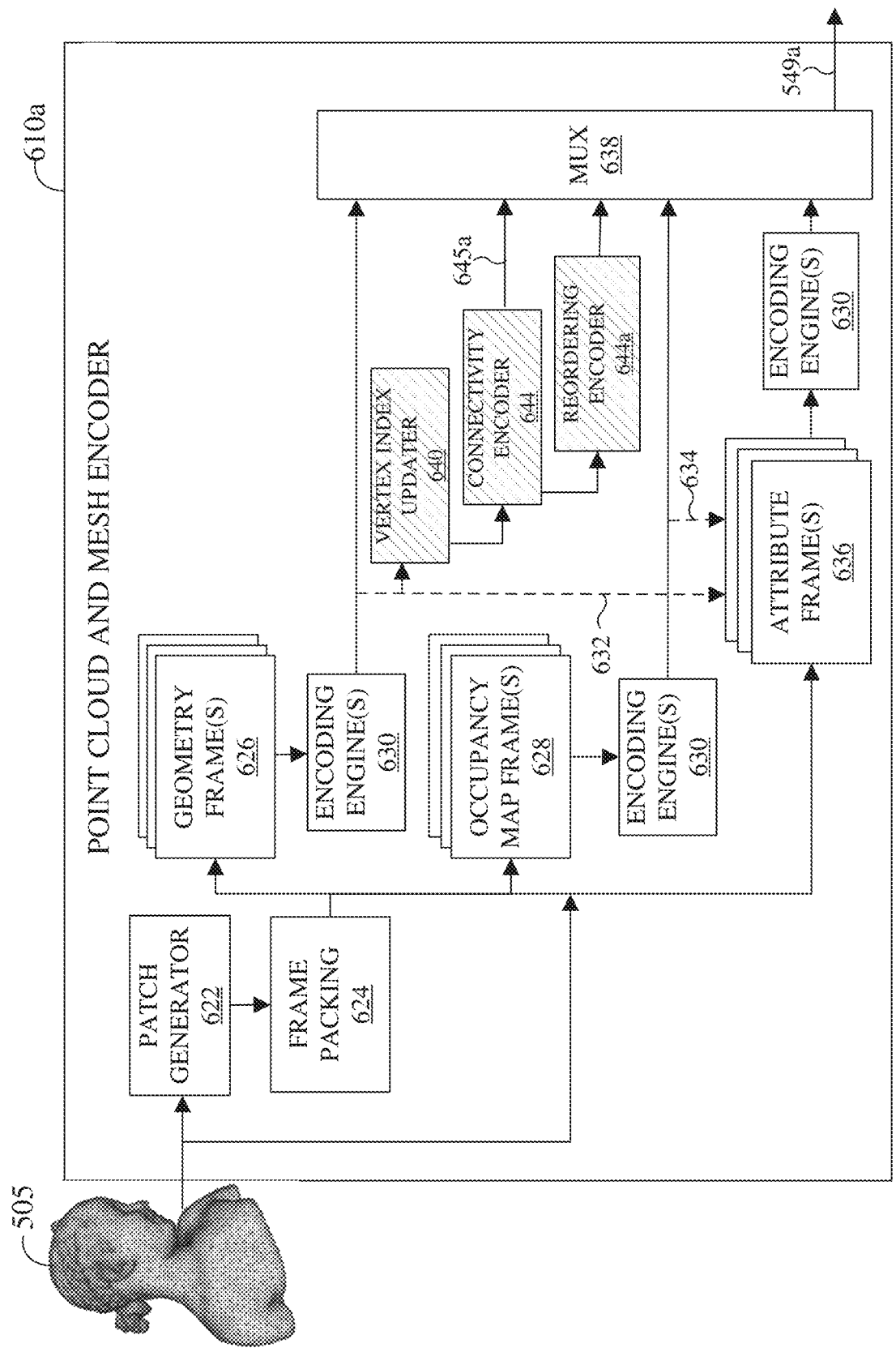
FIGS. 6A and 6B illustrate a detailed block diagrams encoders in accordance with an embodiment of this disclosure.

The point cloud encoder 520 also generates and encodes a binary occupancy map to show the location of projected points in the geometry and attribute video frames. The compressed video frames are multiplexed together with metadata information used for patch creation, to generate the bitstream 539b. FIG. 6A, discussed in greater detail below, describes the point cloud encoder 520 in greater detail.

The connectivity information 514 is defined with respect to the order of the vertices of the mesh 505. When the point cloud encoder 520 reconstructs the geometry coordinates, the order of the reconstructed vertices in the reconstructed mesh can change and therefore be different than the order of the vertices in the mesh 505 (and subsequently the connectivity information 514). That is, the order of the reconstructed vertices may not match the order of the vertices of the connectivity information 514, due to the point cloud encoder 520 reconstructing the mesh. Therefore, before the connectivity information 514 can be encoded (by the connectivity encoder 544) the order of the vertices is updated to correspond to the new order of the reconstructed vertices 539a, by the vertex index updater 540. Therefore, the vertex index updater 540 updates the vertex indices of the mesh 505 to match the new order of the reconstructed vertices.

The vertex index updater 540, of FIGS. 5B and 5C, receives the reconstructed vertices 539a from the point cloud encoder 520, the vertex coordinates and attribute information 513, and the connectivity information 514. An example of index relating the vertex coordinates and attribute information 513, the reconstructed vertices 539a, and the connectivity information 514 is illustrated in FIG. 5D.

The vertex index updater 540 maps the vertices from the vertex coordinates and attribute information 513 (which is based on the mesh 505) to the vertex indices of the reconstructed vertices 539a. For example, as illustrated in FIG. 5D, the vertex 1 of the vertex coordinate and attribute information 513 indicates that it is positioned at (247, 173, 22) and vertex 1 of the reconstructed vertices 539a indicates that it is positioned at (247,163,22). As indicated the vertex 1 of the vertex coordinates and attribute information 513 does not correspond to the same vertex as index 1 of the reconstructed vertices 539a. However, vertex 1 of the vertex coordinates and attribute information 513 corresponds to index 4 of the reconstructed vertices 539a. That is, the vertex 1 of the vertex coordinates and attribute information 513 corresponds to the same vertex as indicated by vertex 4 of the reconstructed vertices 539a. Similarly, vertex 2 of the vertex coordinates and attribute information 513 corresponds to vertex 1 of the reconstructed vertices 539a. Vertex 3 of the vertex coordinates and attribute information 513 corresponds to vertex 2 of the reconstructed vertices 539a. Vertex 4 of the vertex coordinates and attribute information 513 corresponds to vertex 5 of the reconstructed vertices 539a. Finally, vertex 5 of the vertex coordinates and attribute information 513 corresponds to vertex 3 of the reconstructed vertices 539a.

After mapping the vertices from the vertex coordinates and attribute information 513 to the vertex indices of the reconstructed vertices 539a, the vertex index updater 540 generates a new index 542. The new index relates the connectivity information 514 that specifies the vertices that form each face of the mesh (which is based on the vertex coordinates and attribute information 513 and the mesh 505) to the reconstructed vertices 539a. For example, as illustrated in FIG. 5D, face 1 of the connectivity information 514, is formed by three edges that connect the three vertices such as vertex 1, vertex 2, and vertex 5 as defined in the vertex coordinates and attribute information 513. That is, the face index number 1 of the connectivity information 514 is formed by the vertex 1, vertex 2, and vertex 5, which corresponds to the vertices at positions (247, 173, 22), (247, 163, 22), and (213, 465, 80), respectively. The vertex index updater 540 generates a new index 542 based on the mapped vertices from the vertex coordinates and attribute information 513 to the vertex indices of the reconstructed vertices 539a. Since the vertex 1, vertex 2, and vertex 5 of the vertex coordinates and attribute information 513 correspond to the vertex 4, vertex 1, and vertex 3 of the reconstructed vertices 539a, respectively, the new index 542 specifies that the face index number 1 would correspond to the vertex 4, vertex 1, and vertex 3 of the reconstructed vertices 539a, to maintain the same connectivity information.

In certain embodiments, the vertex index updater 540 uses a searching mechanism such as a KD tree to map and relate the reconstructed vertices 539a to the input vertices of the mesh 505 (indicated by the vertex coordinates and attribute information 513). Then the identified correspondence is used to update the vertex indices according to the order of the reconstructed points.

The connectivity encoder 544 of FIGS. 5B and 5C encodes the connectivity information 514 as indicated by the new index 542. If the new index 542 includes all of the connectivity information 514, albeit in a different order, then the connectivity encoder 544 encodes the new index 542.

The encoder 510a of FIG. 5B and the encoder 510b of FIG. 5C both use the connectivity encoder 544 to encode the connectivity information 542. The order by which the vertices are traversed by the connectivity encoder 544 can be different than the order of vertices presumed in the connectivity information as indicated by the new index 542. As such, the encoder 510a generates and transmits a reverse vertex traversal map to the decoder, such as the decoder 550a of FIG. 5F. The reverse vertex traversal map maps the traversal order of vertices defined by the connectivity encoder 544 back to the order of vertices presumed in the connectivity information as indicated by the new index 542. The reordering encoder 547a encodes the output of the reverse mapper 546, such as a reverse vertex traversal map. The decoder 550a of FIG. 5F decodes and uses the reverse vertex traversal map to update the vertex indices to match the order of the vertices of the reconstructed geometry coordinates. Similarly, the encoder 510b generates and encodes (via the ordering encoder 547b) a traversal map 545c, which is then transmitted to the decoder, such as the decoder 550b of FIG. 5G. The traversal map 545c maps the order of vertices presumed in the connectivity information as indicated by the new index 542 to the traversal order of vertices defined by the connectivity encoder 544. The decoder 550b uses the traversal map to update the order of the vertices of the reconstructed geometry and attribute to match the order of vertices presumed in the vertex indices of the connectivity information.

In certain embodiments, the connectivity encoder 544 encodes the connectivity information 514 as auxiliary data. In certain embodiments, the connectivity encoder 544 uses a coding technique such as Edgebreaker to encode the connectivity information 514. In certain embodiments, the connectivity encoder 544 uses a coding technique such as TFAN to encode the connectivity information 514.

The connectivity encoder 544, of FIG. 5B, generates a connectivity bitstream 545a and a vertex traversal map 545b. Similarly, the connectivity encoder 544, of FIG. 5C, generates a connectivity bitstream 545a and a vertex traversal map 545c. The connectivity bitstream 545a represents the encoded connectivity information such as the connectivity information 514 based on the order indicated by the new index 542.

The connectivity encoder 544 does not preserve the order of vertices. Since the connectivity information is encoded (by the connectivity encoder 544) in a different order than the vertex coordinates and attributes (which are encoded by the point cloud encoder 520), the vertex traversal map 545b is signaled to relate the vertex indices to their corresponding vertex coordinates. That is, the vertex traversal map 545b represents the relationship between the vertex indices and their corresponding vertex coordinates can be signaled via a lookup table.

In certain embodiments, as described in FIG. 5B, a reverse order of the vertex traversal map 545b is included in the bitstream 549a, such that the reverse order of the vertex traversal map 545b is transmitted to the decoder 550. As illustrated, if the vertex order was (1, 2, 3, 4, 5, 6, 7), the vertex traversal map 545b may be (1, 3, 7, 6, 2, 4, 5). The reverse mapper 546 generates a reverse vertex traversal map. The reverse vertex traversal map relates the vertex order to the vertex traversal map in reverse. For example, to relate, the vertex order to the vertex traversal map 545b, the reverse mapper 546 generates a reverse vertex traversal map which is encoded as a reordered bitstream 546a. The reverse vertex traversal map (which relates in reverse the vertex order to the vertex traversal map), represented as the reordered bitstream 546a, would then be (1, 5, 2, 6, 7, 4, 3). It is noted that the connectivity encoder 544 is not limited to 7 vertices and any number of vertices can be encoded by the connectivity encoder 544. Similarly, the vertex traversal map and the reverse vertex traversal map are not limited to a particular size.

As illustrated, the first position in the vertex order is vertex 1, and the first position in the vertex traversal map 545b is vertex 1. Since both indices have vertex 1 in the first position, then the reverse mapper 546 specifies that the first position of the reordered bitstream 546a is the vertex 1. The second position in the vertex order is vertex 2, and the second position in the vertex traversal map 545b is vertex 3. Since the second position relates to two different vertices, the reverse mapper 546 identifies that the vertex 2 is located at the fifth position in the vertex traversal map 545b. Therefore, the reordered bitstream 546a includes the value 5 in the second position. Similarly, the third position in the vertex order is vertex 3, and the third position in the vertex traversal map 545b is vertex 7. Since the third position relates to two different vertices, the reverse mapper 546 identifies that the vertex 3 is located at the second position in the vertex traversal map 545b. Therefore, the reordered bitstream 546a includes the value 2 in the third position. Additionally, the fourth position in the vertex order is vertex 4, and the fourth position in the vertex traversal map 545b is vertex 6. Since the fourth position relates to two different vertices, the reverse mapper 546 identifies that the vertex 4 is located at the sixth position in the vertex traversal map 545b. Therefore, the reordered bitstream 546a includes the value 6 in the fourth position. The reverse mapper 546 continues mapping in this manner until the reordered bitstream 546a is generated. The reordering encoder 547a encodes the reordered bitstream 546a.

The multiplexer 548a, of FIG. 5B, combines the bitstream 539b, the connectivity bitstream 545a, and the reordered bitstream 546a to generate the bitstream 549a. It is noted that when the reverse vertex traversal map (represented as the reordered bitstream 546a) is generated and included in the bitstream 549a, the reverse vertex traversal map is applied to the connectivity information in the decoder 550, (such as the decoder 550a of FIG. 5F).

In certain embodiments, as illustrated by the encoder 510b of the in FIG. 5C, the vertex traversal map 545c, which is encoded, by the reordering encoder 547b and then included in the bitstream 549b (instead of the reverse vertex traversal which is represented as the reordered bitstream 546a). For example, the vertex traversal map 545c is encoded by the reordering encoder 547b and directly transmitted to the decoder 550. The encoded vertex traversal map is combined with the connectivity bitstream 545a and the bitstream 539b, by the multiplexer 548b, to generate the bitstream 549b. That is, the multiplexer 548b combines the encoded vertex traversal map, the connectivity bitstream 545a, and the bitstream 539b, generate the bitstream 549b. It is noted that when the encoded vertex traversal map is generated and included in the bitstream 549b, the vertex traversal map is applied to the vertex coordinates and attributes in the decoder 550 (such as the decoder 550b of FIG. 5G). The reordering encoder 547a of FIG. 5B and the reordering encoder 547b of FIG. 5C are similar as both encode the reordering information, such as the vertex traversal map and the reverse vertex traversal map.

Figure 5E:
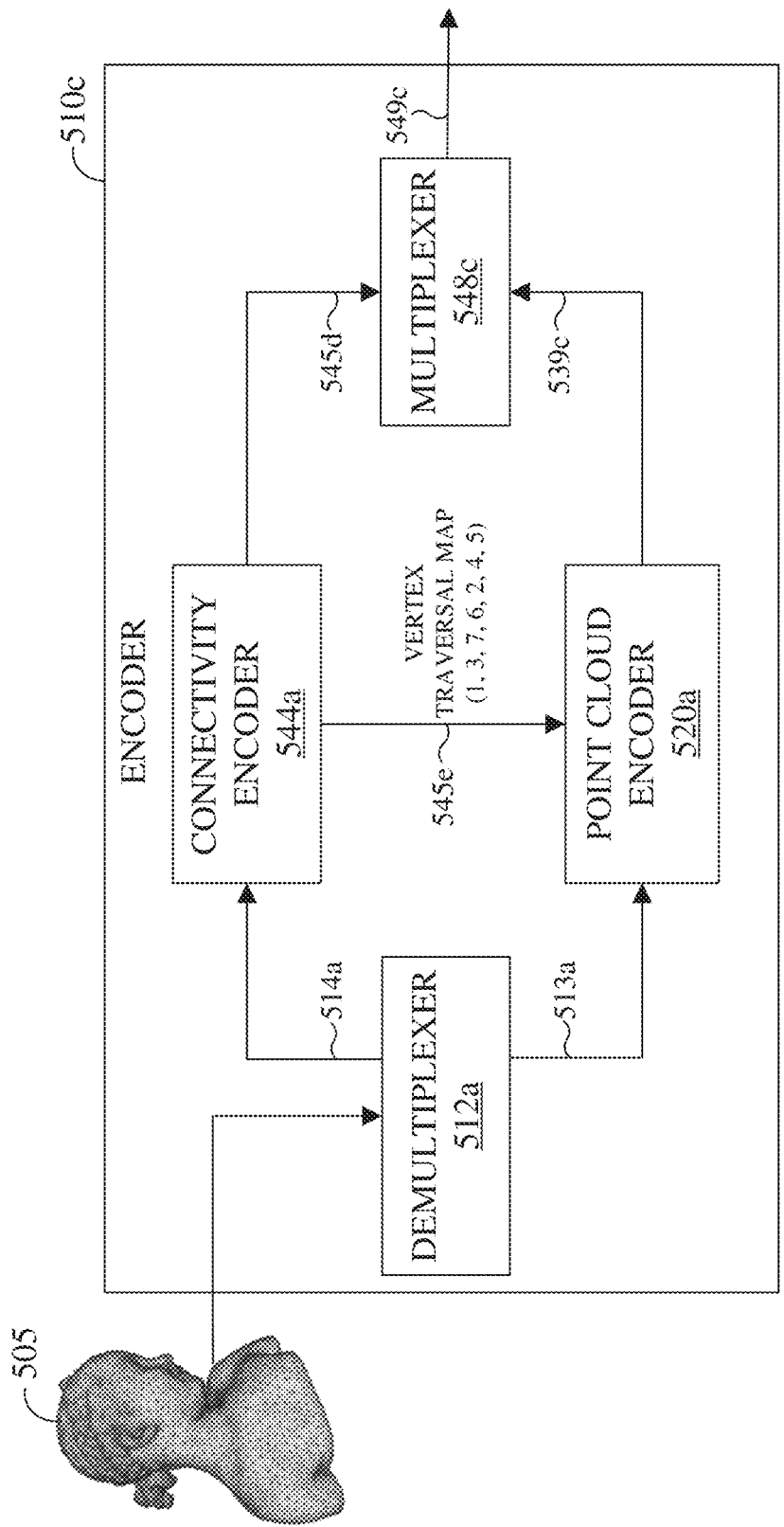
FIG. 5E illustrates a block diagram of an encoder in accordance with an embodiment of this disclosure.

FIG. 5E illustrates a block diagram of the encoder 510c. The encoder 510c receives a mesh 505 and generates a bitstream 549c. The mesh 505 is similar to the mesh 505 of FIGS. 5B and 5C. The bitstream 549c includes data representing the mesh 505. The bitstream 549c can include multiple bitstreams and can be transmitted via the network 502 of FIG. 5A to another device, such as the decoder 550 or an information repository. The encoder 510c includes a demultiplexer 512a, a point cloud encoder 520a, a connectivity encoder 544a, and a multiplexer 548c.

The demultiplexer 512a, is similar to the demultiplexer 512 of FIGS. 5B and 5C. The demultiplexer 512a separates the connectivity information 514a of the mesh 505 from the vertex coordinates and attribute information 513a. The connectivity information 514a and the vertex coordinates and attribute information 513a are similar to the connectivity information 514 and the vertex coordinates and attribute information 513 of FIGS. 5B and 5C.

To encode the mesh 505, the encoder 510c encodes the connectivity information 514a prior to encoding the vertex coordinates and attribute information 513a, while the encoders 510a and 510b of FIGS. 5B and 5C perform the encoding in the opposite order.

The connectivity encoder 544a is similar to the connectivity encoder 544 of FIGS. 5B and 5C. For example, the connectivity encoder 544a encodes the connectivity information 514a to generate the connectivity bitstream 545d and a vertex traversal map 545e. As illustrated, the vertex traversal map 545e can be in a different order than the vertex order that is included in the connectivity information 514a. For example, if the vertex order of the connectivity information 514a is (1, 2, 3, 4, 5, 6, 7) then the vertex traversal map 545e can be in a different order such as (1, 3, 7, 6, 2, 4, 5). The connectivity bitstream 545d is similar to the connectivity bitstream 545a of FIGS. 5B and 5C.

In certain embodiments, the connectivity encoder 544a uses a coding technique such as Edgebreaker to encode the connectivity information 514a. In certain embodiments, the connectivity encoder 544 uses a coding technique such as TFAN to encode the connectivity information 514a.

The point cloud encoder 520a encodes the vertex coordinates and attribute information 513a based on the order of the vertex traversal map 545e and generates the bitstream 539c. The point cloud encoder 520a packs vertex coordinates into a raw patch of a geometry frame (similar to the raw patch of the frame 445 of FIG. 4G) and packs the vertex attribute into a raw patch of an attribute frame (similar to the raw patch of the frame 455 of FIG. 4G). A raw patch explicitly stores the information associated with each vertex (such as the X, Y, Z geometry coordinates of each vertex and the R, B, G, color values of each vertex) such that the vertices can be packed in any arbitrary order. For example, the vertex coordinates are packed in the traversal order of the encoded connectivity information into a geometry frame and each attribute is packed in the traversal order of the encoded connectivity information into a respective attribute frame. The point cloud encoder 520a encodes the frames that include the raw patches and generates the bitstream 539c which represents the point cloud bitstream.

By packing the vertex coordinates and attribute information 513a as a raw patch instead of individual patches, the point cloud encoder 520a simplifies encoding as compared to the point cloud encoder 522 of FIGS. 5B and 5C. For example, the point cloud encoder 520a does not need to generate patches since the vertices are not partitioned into different patches. Additionally, the point cloud encoder 520a does not need to pack the individual patches into a frame, fill the inter-patch space of a frames with image padding, perform geometry smoothing, perform color smoothing, generate and compress an occupancy map, generate and compress auxiliary patch information, and the like.

Additionally, by packing the vertex coordinates and attribute information 513a as a raw patch based on the order of the vertex traversal map 545e, the encoder 510c does not include the reordering information in the bitstream 549c. The point cloud encoder 520a may not be as efficient as the point cloud encoder 520 of FIGS. 5A and 5B, however the overall bits of the bitstream 549c can be smaller than the bitstream 549a and 549b since the reordering information is omitted in the bitstream 549c, given the same input data.

The multiplexer 548c combines the bitstream 539c and, the connectivity bitstream 545d to generate the bitstream 549c. The multiplexer 548c does not combine any reordering information since both the connectivity information 514a and the vertex coordinates and attribute information 513a are encoded in the same order.

FIG. 5F illustrates a block diagram of the decoder 550a in accordance with an embodiment of this disclosure. The decoder 550a is similar to the decoder 550 of FIG. 5A. The decoder 550a includes a demultiplexer 552, a connectivity decoder 560, a vertex index updater 562, reordering information decoder 565, a point cloud decoder 570, and a multiplexer 590. FIG. 6C, below, describes decoder 650 in greater details.

The decoder 550a receives a bitstream 549a. The bitstream 549a is the bitstream that was generated by the encoder 510a of FIG. 5B. The demultiplexer 552 separates bitstream 549a into compressed connectivity information, compressed reordering information, and the compressed vertex coordinates and attributes. The connectivity decoder 560 decodes the compressed connectivity information to generate reconstructed connectivity information. The reordering information decoder 565 decodes the compressed reordering information to generate reconstructed reordering information. The point cloud decoder 570 decodes the compressed vertex coordinates and attributes to generate the reconstructed vertex coordinates and attributes. The reconstructed vertices resemble a point cloud, since the vertex coordinates correspond to points located in 3D space.

After the reordering information decoder 565 decodes the compressed reordering information, the vertex index updater 562, updates the indices associated with the reconstructed connectivity information. The vertex index updater 562 updates the index associated with the reconstructed connectivity information such that the index matches the index of the reconstructed vertex coordinates and attributes. That is, the reverse vertex traversal map of FIG. 5B is applied to the connectivity information.

Once the vertices associated with the reconstructed connectivity information and the reconstructed vertex coordinates and attributes are related by similar indices, the multiplexer 590 combines the reconstructed vertex coordinates and attributes with the connectivity information to reconstruct and generate the mesh 595. The reconstructed mesh 595 is similar to the mesh 505.

FIG. 5G illustrates a block diagram of the decoder 550b in accordance with an embodiment of this disclosure. The decoder 550b is similar to the decoder 550 of FIG. 5A. The decoder 550a includes a demultiplexer 552, a connectivity decoder 560, a reordering information decoder 565, a point cloud decoder 570, a vertex index updater 564, and a multiplexer 590

The decoder 550b receives the bitstream 549b. The bitstream 549b is the bitstream that was generated by the encoder 510b of FIG. 5C. The demultiplexer 552 separates bitstream 549b into compressed connectivity information, compressed reordering information, and the compressed vertex coordinates and attributes. The connectivity decoder 560 decodes the compressed connectivity information to generate reconstructed connectivity information. The reordering information decoder 565 decodes the compressed reordering information to generate reconstructed reordering information. The point cloud decoder 570 decodes the compressed vertex coordinates and attributes to generate the reconstructed vertex coordinates and attributes. The reconstructed vertices resemble a point cloud, since the vertex coordinates correspond to points located in 3D space.

After the reordering information decoder 565 decodes the compressed reordering information, the vertex index updater 564, updates the vertex index associated with the reconstructed vertex coordinates and attributes. The vertex index updater 564 updates the index associated with the reconstructed vertex coordinates and attributes such that the index matches the index of the reconstructed connectivity information. That is, the traversal map of FIG. 5C is applied to the vertex coordinates and attributes.

Once the vertices associated with the reconstructed connectivity information and the reconstructed vertex coordinates and attributes are related by similar indices, the multiplexer 590 combines the reconstructed vertex coordinates and attributes with the connectivity information to reconstruct and generate the mesh 595. The reconstructed mesh 595 is similar to the mesh 505.

Figure 5H:
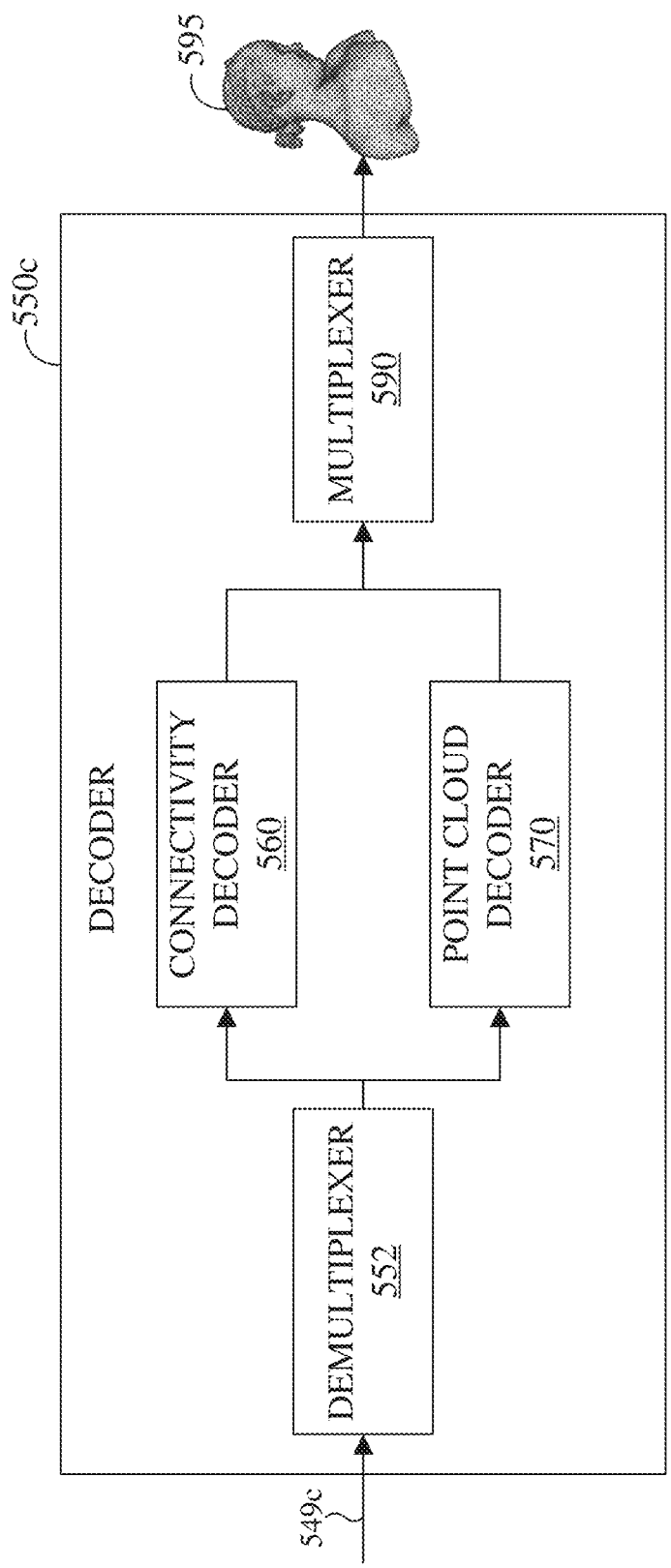

FIG. 5H illustrates a block diagram of the decoder 550c in accordance with an embodiment of this disclosure. The decoder 550c is similar to the decoder 550 of FIG. 5A. The decoder 550c includes a demultiplexer 552, a connectivity decoder 560, a point cloud decoder 570, and a multiplexer 590.

The decoder 550c receives the bitstream 549c. The bitstream 549c is the bitstream that was generated by the encoder 510c of FIG. 5E. The demultiplexer 552 separates bitstream 549b into compressed connectivity information and the compressed vertex coordinates and attributes. The connectivity decoder 560 decodes the compressed connectivity information to generate reconstructed connectivity information. The point cloud decoder 570 decodes the compressed vertex coordinates and attributes to generate the reconstructed vertex coordinates and attributes. The reconstructed vertices resemble a point cloud, since the vertex coordinates correspond to points located in 3D space.

Since the vertex coordinates and attributes were encoded in a raw patch in the order of the connectivity information, the vertex indices of the connectivity information and the vertex coordinates and attributes are similar. Therefore the multiplexer 590 combines the reconstructed vertex coordinates and attributes with the connectivity information to reconstruct and generate the mesh 595. The reconstructed mesh 595 is similar to the mesh 505.

Figure 6B:
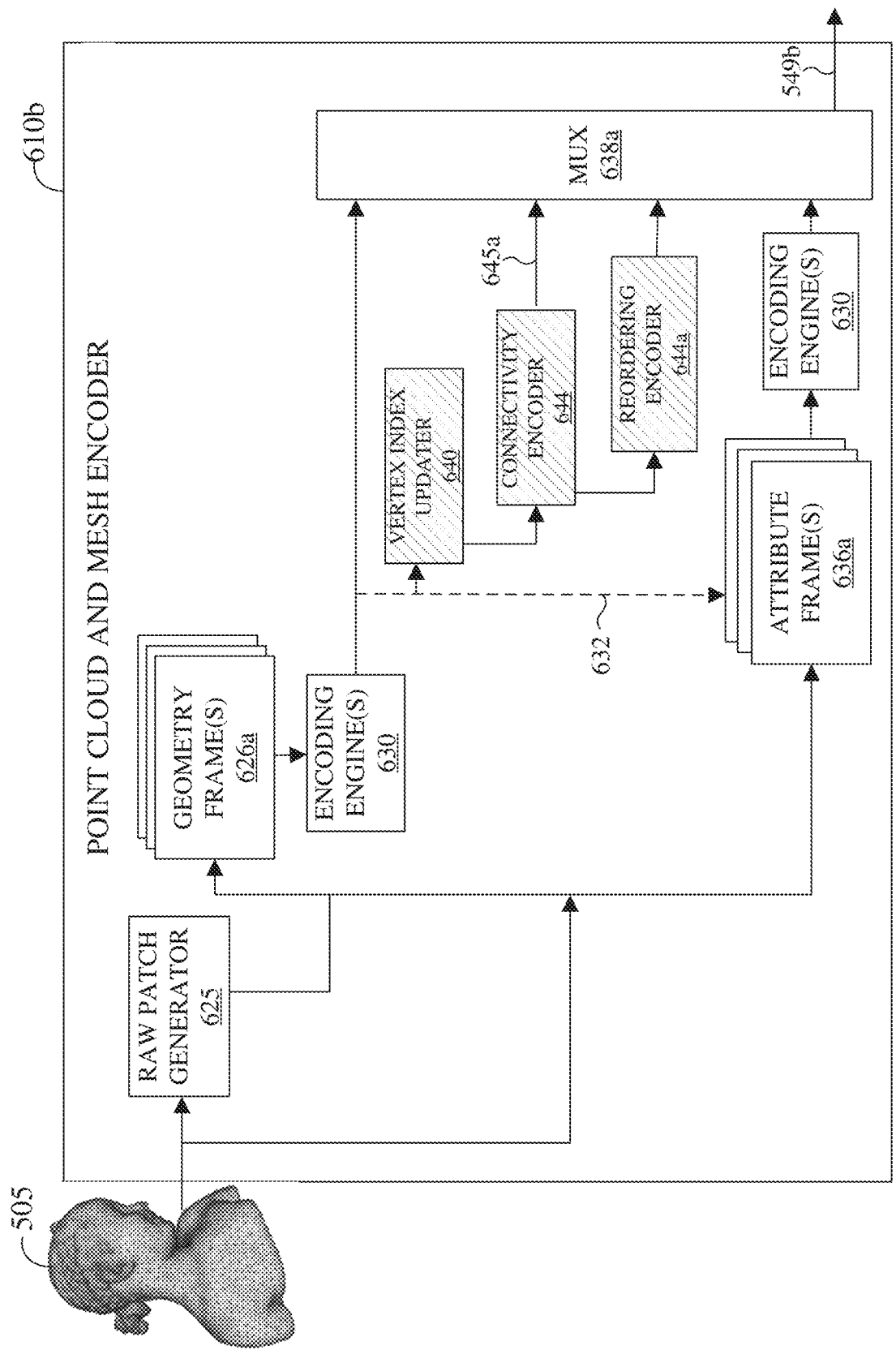
Figure 6C:
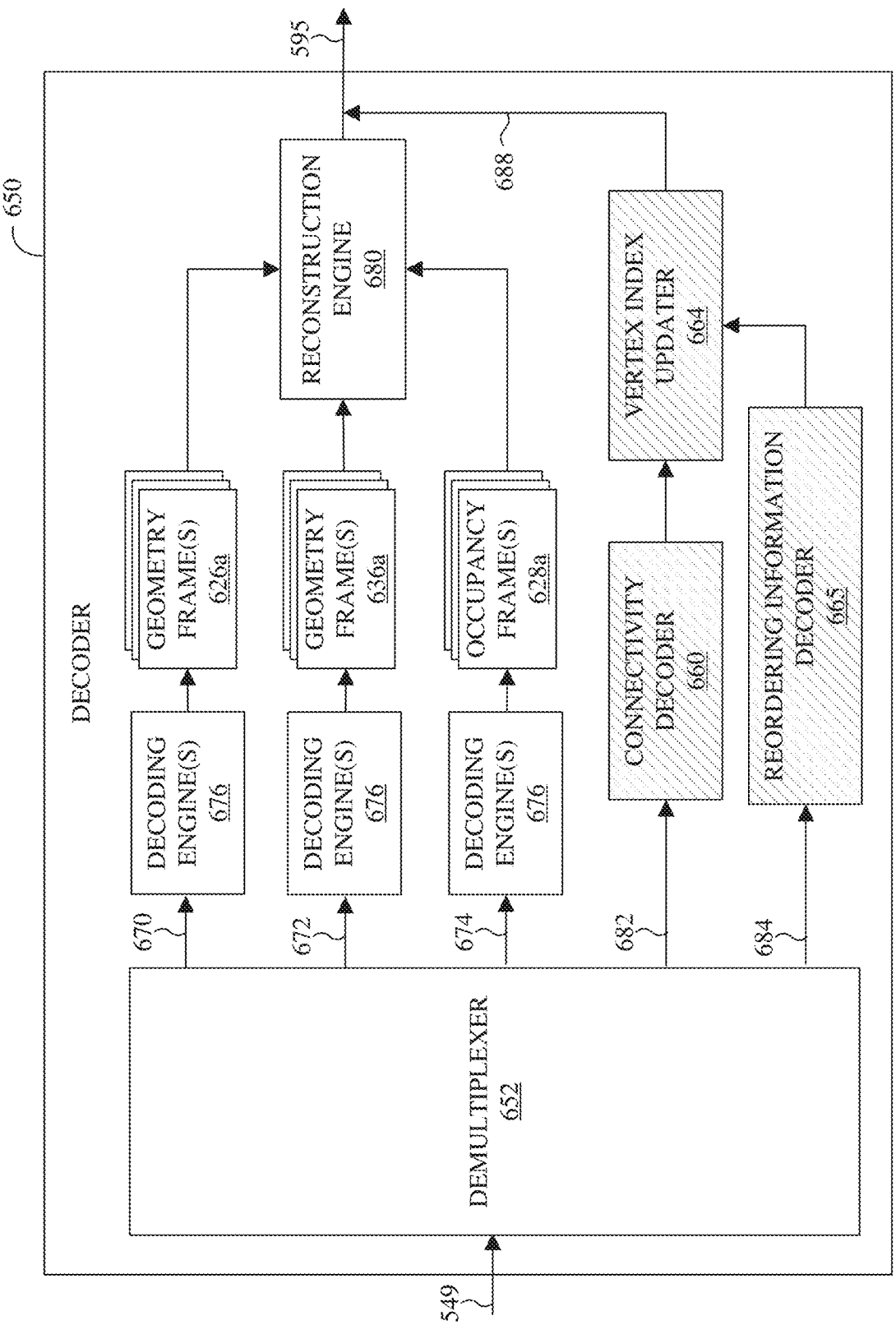
FIG. 6C illustrates a detailed block diagram of a decoder in accordance with an embodiment of this disclosure.

FIGS. 6A and 6B illustrate detailed block diagrams of the encoders 610a and 610b, respectively, in accordance with an embodiment of this disclosure. The encoder 610a is similar to the encoder 510 of FIG. 5A and the encoder 510a of FIG. 5B. The encoder 610b is similar to the encoder 510 of FIG. 5A and the encoder 510c of FIG. 5E. FIG. 6C illustrates a detailed block diagram of a decoder 650 in accordance with an embodiment of this disclosure. For example, the decoder 650 is similar to the decoder 550 of FIG. 5A, the decoder 550a of FIG. 5F, the decoder 550b of FIG. 5G, and the decoder 550c of FIG. 5H.

The encoder 610a of FIG. 6A receives the mesh 505 and generates a bitstream 549a. The bitstream 549a can include multiple bitstreams and can be transmitted via the network 502 of FIG. 5A to another device, such as the decoder 550 or an information repository. The encoder 610a includes a patch generator 622, a frame packing 624, various frames (such as one or more geometry frames 626, one or more attribute frames 636, and one or more occupancy map frames 628), one or more encoding engines 630, a vertex index updated 640, a connectivity encoder 644, a reordering encoder 644a, and a multiplexer 638.

A demultiplexer, such as the demultiplexer 512 of FIG. 5B separates the connectivity information of the mesh 505 from the vertex coordinates and attributes. The patch generator 622 generates patches by taking projections of the vertices of the mesh 505. In certain embodiments, the patch generator 622 splits the geometry attribute and each attribute of each point of the mesh 505. The patch generator 622 can use two or more projection planes, to cluster the vertices of the mesh 505 to generate the patches. The geometry attribute and each attribute are eventually packed into respective geometry frames 626 or the attribute frames 636.

The vertex coordinates are clustered using one or more criteria. The criteria include a normal direction, a distance to projected frames, contiguity, and the like. After the vertices are clustered, the geometry attribute for each vertex is projected onto planes, such as the XY plane, the YZ plane, or the XZ plane.

The frame packing 624 sorts and packs the geometry patches into the geometry frames 626. The geometry frames 626 are similar to the frame 440 of FIG. 4F. The frame packing 516 also generates one or more occupancy map frames 628 based on the placement of the patches within the geometry frames 626.

The geometry frames 626 include pixels representing the geometry values of the vertices of the mesh 505. The geometry frames 626 represent the geographic location of each vertex of the mesh 505. In certain embodiments, padding is included in the geometry frames 626.

The occupancy map frames 628 represent occupancy maps that indicate the valid pixels in the geometry frames 626. For example, the occupancy map frames 628 indicate whether each pixel in a frame is a valid pixel or an invalid pixel. The valid pixels correspond to pixels that represent vertices of the mesh 505. The invalid pixels are pixels within a frame that do not represent vertices of the mesh 505 and correspond to inter-patch spaces. For example, when the frame packing 624 generates the occupancy map frames 628, the occupancy map frames include predefined values, such as zero or one, for each pixel. When the value of a pixel in the occupancy map at position (u, v) is zero, then the pixel at (u, v) in the geometry frame 626 is invalid. When the value of a pixel in the occupancy map at position (u, v) is one, then the pixel at (u, v) in the geometry frame 626 is valid.

After the geometry frames 626 and the occupancy map frame 628 are generated, the frames are encoded using the encoding engines 630. In certain embodiments. In certain embodiments, the frames (such as the geometry frames 626 and the occupancy map frames 628) are encoded by independent encoders. For example, one encoding engine 630 can encode the geometry frames 626 and another encoding engine 630 can encode the occupancy map frames 628. In certain embodiments, the encoding engines 630 can be configured to support an 8-bit, a 10-bit, a 12-bit, a 14-bit, or a 16-bit, precision of data. The encoding engine 630 can be a video or image codec such as HEVC, AVC, VP9, VP8, VVC, and the like to compress the 2D frames representing the 3D point cloud.

After the geometry frames 626 and the occupancy map frames 628 are encoded by the encoding engines 630, they are decoded and reconstructed. The encoder 610a reconstructs the vertices of the mesh 505 to generate the attribute frames. For example, the reconstructed geometry frames 632 and the reconstructed occupancy map frames 634 are used to reconstruct the vertices in 3D space. Each attribute associated with the mesh are interpolated based on the location of the vertices in the reconstructed mesh and the mesh 505, since the vertices of the can shift reconstructed mesh can shift when the frames are encoded and subsequently decoded.

The frame packing 624 uses the same patches that were used in the geometry frames to generate the attribute patches. For example, for each vertex of the mesh 505 that is represented by a pixel in a geometry patch, can be similarly represented by a pixel in a color patch. For example, a vertex that is represented by a pixel value at position (u, v) in the geometry frame can also be represented by a pixel at position (u, v) in the attribute frame that is assigned a value representing the color. Color represents a single attribute of each vertex of a given mesh. For example, if the geometry frame 626 indicates where each vertex of the mesh 505 is in 3D space, then each corresponding attribute frame 636 indicates a corresponding attribute of the mesh 505. In certain embodiments, for each geometry frame 626 at least one corresponding attribute frame 636 is generated.

The vertex index update 640 is similar to the vertex index update 540 of FIG. 5B. For example, the vertex index updater 640 generates a map relating the vertices from the vertex attribute information of the mesh 505 to the vertex indices of the reconstructed geometry frames 632.

The connectivity encoder 644 is similar to the connectivity encoder 544 of FIG. 5B. For example, the connectivity encoder 644 encodes the connectivity information of the mesh 505 based on the index order mapping generated by the vertex index updater 640. The connectivity encoder 644 generates the encoded connectivity information 656a.

The reordering encoder 644a can include the reverse mapper 546 of FIG. 5B, which reverses vertex traversal map. The reordering encoder 644a can also encode the reordering information.

The multiplexer 638 can be similar to the multiplexer 548a of FIG. 5B. For example, the multiplexer 638 combines the encoded geometry frames 626, the encoded occupancy map frames 628, the encoded attribute frames 636, the encoded connectivity information 645a, and the encoded reordering information that was generated by the reordering encoder 644a, to create a bitstream 549a. In certain embodiments, after reconstructed geometry frames 632 are reconstructed, the encoder 610a can perform geometry smoothing. The geometry smoothing parameters can be multiplexed by the multiplexer 638 and included in the bitstream 549a. In certain embodiments, the encoder 610a can also perform attribute smoothing for each attribute. Attribute smoothing parameters can then be multiplexed by the multiplexer 638 and included in the bitstream 549a.

The encoder 610b of FIG. 6B receives the mesh 505 and generates a bitstream 549c. The bitstream 549c can include multiple bitstreams and can be transmitted via the network 502 of FIG. 5A to another device, such as the decoder 550 or an information repository. The encoder 610b includes a raw patch generator 625, one or more geometry frames 626 and one or more attribute frames 636, one or more encoding engines 630, a vertex index updated 640, a connectivity encoder 644, a reordering encoder 644a, and a multiplexer 638.

A demultiplexer, such as the demultiplexer 512a of FIG. 5E separates the connectivity information of the mesh 505 from the vertex coordinates and attributes. The raw patch generator 625 generates a raw patch that represents the vertex coordinates and stores the raw patch in the geometry frames 626a. The geometry frames 626a that include the raw patch can be similar to the frame 445 of FIG. 4G.

After the geometry frames 626a are generated, the frames are encoded using the encoding engines 630. The encoding engine 630 can be a video or image codec such as HEVC, AVC, VP9, VP8, VVC, and the like to compress the 2D frames representing the 3D point cloud.

After the geometry frames 626a are encoded by the encoding engines 630, they are decoded and reconstructed. The encoder 610a reconstructs the vertices of the mesh 505 to generate the attribute frames 636a. For example, the reconstructed geometry frames 632a are used to reconstruct the vertices in 3D space. Each attribute associated with the mesh are interpolated based on the location of the vertices in the reconstructed mesh and the mesh 505, since the vertices of the can shift reconstructed mesh can shift when the frames are encoded and subsequently decoded. The interpolated values are stored in the raw patch of the attribute frames 636a. The encoding engine 630 then encodes the attribute frames 636a.

The raw patch generator 625 represents the attributes of the mesh 505 as a raw patch. For example, for each geometry frame 626a a corresponding attribute frame 636a is generated and includes a raw patch representing a single attribute of the mesh 505.

The vertex index update 640 is similar to the vertex index update 540 of FIG. 5B. For example, the vertex index updater 640 generates a map relating the vertices from the vertex attribute information of the mesh 505 to the vertex indices of the reconstructed geometry frames 632.

The connectivity encoder 644 is similar to the connectivity encoder 544 of FIG. 5B. For example, the connectivity encoder 644 encodes the connectivity information of the mesh 505 based on the index order mapping generated by the vertex index updater 640. The connectivity encoder 644 generates the encoded connectivity information 656a.

The reordering encoder 644a can include the reverse mapper 546 of FIG. 5B, which reverses the vertex traversal map. The reordering encoder 644a can also encode the reordering information.

In certain embodiments, the connectivity encoder 644 encodes the connectivity information prior to the raw patch generator 625 generating the raw patch for the geometry frames 626a. When the connectivity encoder 644 encodes the connectivity information prior to the raw patch generator 625 generating the raw patch for the geometry frames 626a, then the raw patch generator 625 generates a raw patch based on the traversal order that the connectivity information is encoded. Therefore, when the raw patch generator 625 generates a raw patch based on the traversal order that the connectivity information is encoded, the vertex index update 640 and the reordering encoder 644a can be omitted from the FIG. 5B.

The multiplexer 638a can be similar to the multiplexer 548c of FIG. 5E. For example, the multiplexer 638a combines the encoded geometry frames 626a, the encoded attribute frames 636a, the encoded connectivity information 645a, and the encoded reordering information that was generated by the reordering encoder 644a, to create a bitstream 549b.

It is noted that the encoder 610a of FIG. 6A and the encoder 610b of FIG. 6B are similar, as both encoders include a point cloud encoder and a connectivity encoder. However the point cloud encoder of the encoder 610a generates multiple patches that represent the mesh 505, while the encoder 610b generates a single raw patch.

The decoder 650 of FIG. 6C receives a bitstream 549 and generates a mesh 595. The bitstream 549 can be similar to the bitstream 549a of FIGS. 5B, 5F, and 6A, the bitstream 549b of FIGS. 5C, 5G, or the bitstream 549c of FIGS. 5E and 5H. The bitstream 549 can include multiple bitstreams.

The demultiplexer 652 is similar to the demultiplexer 552 of FIGS. 5F, 5G, and 5H. The demultiplexer 652 separates bitstream 549 into one or more bitstreams representing the different frames, the connectivity information, and the reordering information.

For example, the demultiplexer 552 separates various streams of data such as the geometry frame information 670, attribute frame information 672, the occupancy map information 674 (if the occupancy map information as included in the bitstream), the encoded connectivity information 682, and the encoded reordering information 684 (if the reordering information as included in the bitstream).

The decoding engines 676 decode the geometry frame information 670 to generate the geometry frames 626a. The decoding engines 676 decode the attribute frame information 672 to generate the attribute frames 636a. Similarly, the decoding engines 676 decode the occupancy map information 674 to generate the occupancy map frames 628a. In certain embodiments, a single decoding engine 676 decodes the geometry frame information 670, the attribute frame information 672, and the occupancy map information 674. In certain embodiments, the bitstream 649 does not include the occupancy map information 674.

After the geometry frame information 670, the attribute frame information 672, and the occupancy map information 674 are decoded, the reconstruction engine 680 reconstructs the vertices of the mesh 505. The reconstructed vertices of the mesh resemble a point cloud, since the vertices are points located in 3D space. When geometry smoothing parameters are included in the bitstream 549, the decoder 610 performs geometry smoothing after the geometry and attribute of the vertices are reconstructed. Similarly, when attribute smoothing parameters are included in the bitstream 549, the decoder 610 performs attribute smoothing. The attribute smoothing is performed after geometry smoothing.

The connectivity decoder 660 is similar to the connectivity decoder 560 of FIGS. 5F, 5G, and 5H. The connectivity decoder 560 decodes the compressed connectivity information to generate reconstructed connectivity information.

When the reordering information 684 is included in the bitstream 549, then the reordering information decoder 665 decodes the reordering information 684. Reordering information decoder 665 is similar to the reordering information decoder 565 of FIGS. 5F and 5G. It is noted that the reordering information 684 may not be included in the bitstream 549, such as the bitstream 549c of FIG. 5E.

The vertex index updater 640 updates the connectivity information. The vertex index updater 640 is similar to the vertex index updater 562 of FIG. 5F or the vertex index updater 564 of FIG. 5G. The vertex index updater 640 updates the vertices associated with the reconstructed vertex coordinates.

The decoder 650 uses the connectivity information 688 and the reconstructed vertices to generate the mesh 595. For example, the decoder 650 applies the connectivity information to the corresponding vertices such that the mesh can be reconstructed.

Although FIGS. 5A-6C illustrate examples of transmitting a point cloud various changes may be made to FIGS. 5A-6C. For example, additional components can be included in the encoder 510 and the decoder 550. For another example, components can be omitted from the encoder 510 and the decoder 550.

Figure 7A:
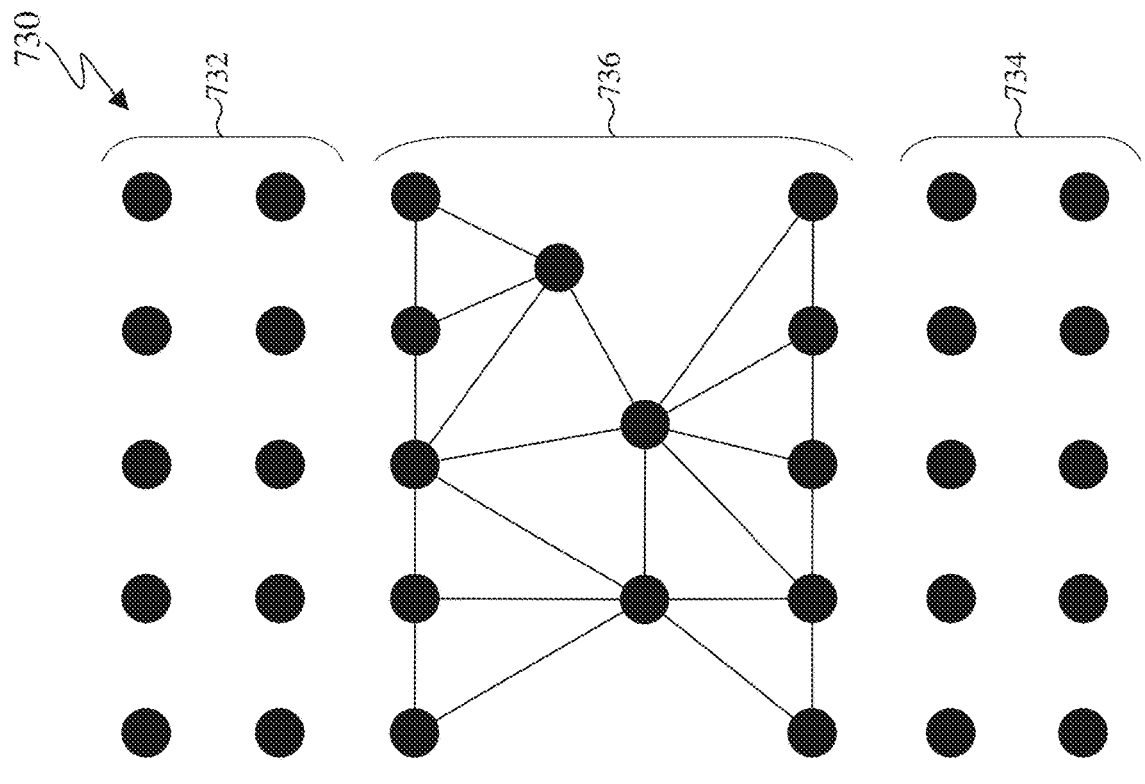
FIGS. 7A and 7B illustrate an example adaptive mesh and a method of generating the adaptive mesh in accordance with an embodiment of this disclosure.
Figure 7A:
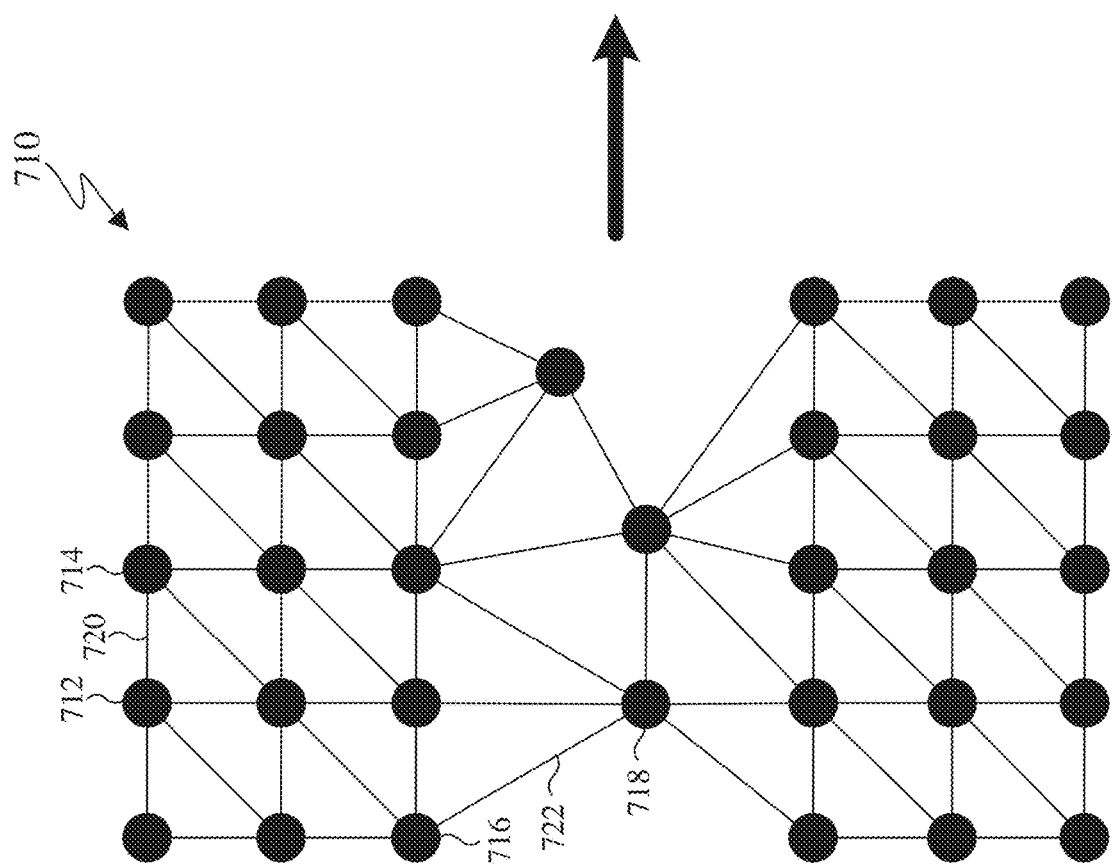

FIG. 7A illustrates an example adaptive mesh in accordance with an embodiment of this disclosure. In particular, FIG. 7A illustrates a portion of a mesh 710 and a portion of an adaptive mesh 730. The mesh 710 can be a portion of a larger mesh such as the mesh 505 of FIGS. 5B, 5C, 5E, 6A, and 6B. Similarly, the adaptive mesh 730 can be a portion of the mesh 595 of FIGS. 5F, 5G, 5G, and 6C. It is noted that although the mesh 710 and 730 are illustrated in two dimensions, the mesh is three dimensions.

Figure 7B:
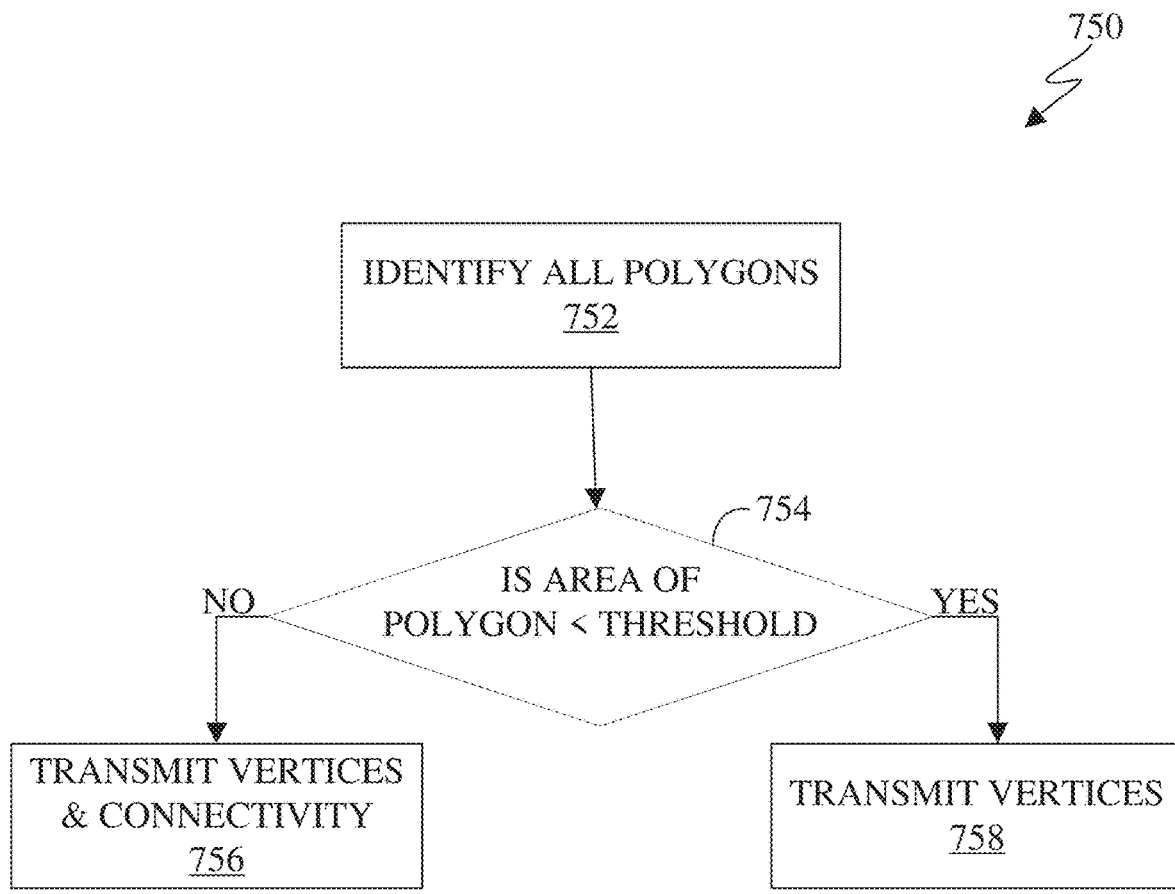

FIG. 7B illustrates an example method 750 of generating the adaptive mesh 730 in accordance with an embodiment of this disclosure. The method 750 can be performed by the server 104 or any of the client devices 106-116 of FIG. 1, the server 200 of FIG. 2, the electronic device 300 of FIG. 3, the encoder 510 of FIG. 5A the encoder 510a of FIG. 5B, the encoder 510c of FIG. 5C, the encoder 510c of FIG. 5E, the encoder 610a of FIG. 6A, the encoder 610b of FIG. 6B, or any other suitable device or system. For ease of explanation, the method 750 is described as being performed by the encoder 510 of FIG. 5A.

As illustrated the mesh 710 includes vertices, such as the vertices 712, 714, 716, and 718. The mesh 710 also includes the connectivity information such as the edge 720 and 722. The edge 720 connects the vertices 712 and 714 and the edge 722 connects the vertices 716 and 718. The edges, such as the edge 720 and the edge 722 represent the connectivity information the edges provide the information as to which vertex is connected to another vertex.

An encoder (such as the encoder 510) can determine not to encode and transmit all of the vertex connectivity information for a given mesh. Rather, an encoder can select certain connectivity information. When the encoder does not transmit a portion of the connectivity information, then an adaptive mesh 730 is reconstructed by the decoder (such as the decoder 550 of FIG. 5A and 650 of FIG. 6C).

In certain meshes, the vertices may not be evenly distributed, as such, the length of each edge can vary throughout a mesh, and subsequently the area of each face can vary throughout a mesh. The encoder can determine to selects certain connectivity information to be transmitted with the vertices. Similarly, the encoder can determine not to select certain connectivity information. For example, the bitrate of a mesh can be reduced for areas of the mesh that include a high point density by dropping the connectivity and encoding that area of the mesh as point cloud. The rendering quality improves for areas of a mesh with low point density by keeping the connectivity information and encoding the 3D object as a mesh In certain embodiments, the encoder can identify for vertices that are evenly distributed (such as the areas 732 and 734) and determine not to transmit the connectivity information, such as the areas 732 and 734. At the decoder, the connectivity for those areas is restored using a surface reconstruction technique. However, the encoder can also identify vertices that are not evenly distributed, such as the area 736, and determine to transmit to a decoder the connectivity information for a portion of the mesh that corresponds to the area 736.

In certain embodiments, as described in the method 750 of FIG. 7B an encoder (such as the encoder 510 of FIG. 5A) can compare the area of each face of the mesh to a threshold when determining whether to transmit the mesh connectivity information. In step 752, the encoder identifies all of the polygons. A polygon is similar to the face as illustrated in FIG. 4C. In step 754, the encoder then compares the area of each polygon to a threshold.

When the area is of the polygon is larger than a threshold, then in step 756, the encoder determines to transmit both the vertices and the connectivity information. When transmitting the vertices and the connectivity information the reconstructed mesh will be similar to the area 736 of FIG. 7A and resemble a mesh. For example, when the area of the polygon is large, indicates a low point density (vertex density) and therefore the connectivity information will improve the visual appearance of the mesh.

When the area is less than the threshold, then in step 758, the encoder determines to transmit vertices but not transmit the connectivity information. When only the vertices for certain polygons are transmitted, the reconstructed mesh for that area will be similar to the areas 732 and 734 of FIG. 7A and resemble a point cloud. For example, when the area of the polygon is smaller than the threshold indicates that the point density (vertex density) is high, and therefore the connectivity information does not improve the visual appearance of the mesh.

In certain embodiments, a local smoothness factor is used to determine rendering a local region of a mesh as a mesh or point cloud. An encoder (such as the encoder 510 of FIG. 5A) can determine to send certain vertices and certain connectivity information based on the local smoothness factor. For example, a large flat area, such as a wall, can be rendered as a single polygon rather than a point cloud or many smaller polygons.

Although FIGS. 7A and 7B illustrate one example of an adaptive mesh and a method thereof, various changes may be made to FIGS. 7A and 7B. For example, while the method 750 is shown as a series of steps, various steps in FIG. 7B could overlap, occur in parallel, or occur any number of times.

Figure 8:
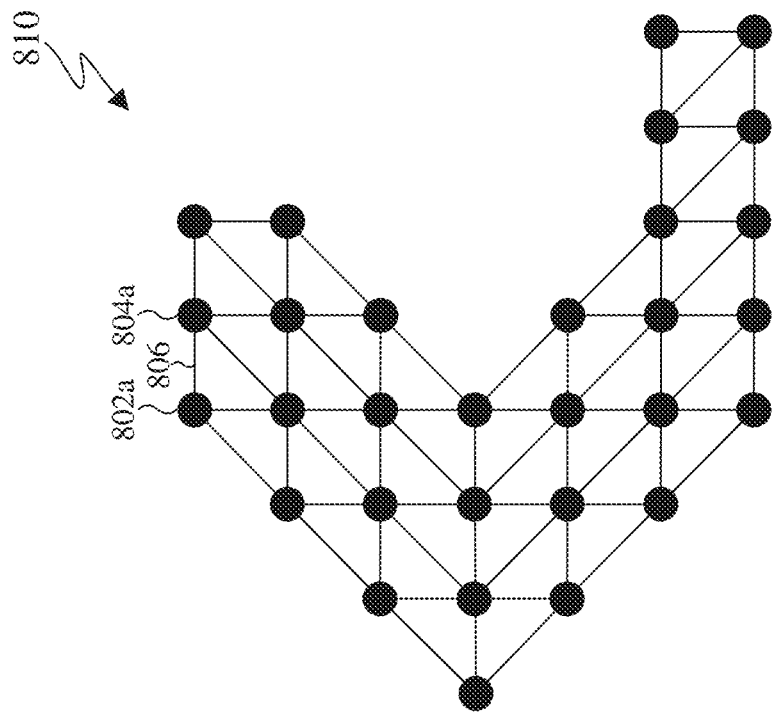
FIG. 8 illustrates a diagram of inner patch connectivity in accordance with an embodiment of this disclosure.
Figure 8:
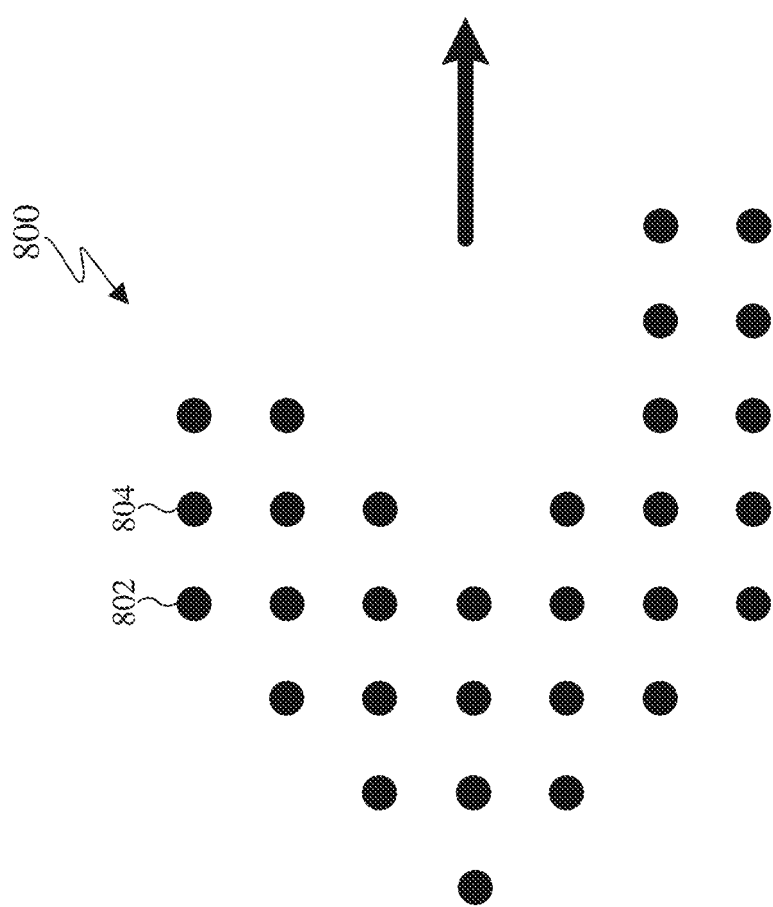

FIG. 8 illustrates a diagram of inner patch connectivity in accordance with an embodiment of this disclosure. In particular, FIG. 8 illustrates a patch 800 and a derived mesh 810. The patch 800 can be a patch of the point cloud 410 of FIG. 4D, or a portion of the adaptive mesh 730 of FIG. 7A or a patch of the mesh where the connectivity information was not transmitted in the bitstream. The derived mesh 810 can be similar to the mesh 595 of FIGS. 5F. 5G. 5H, and 6C.

An encoder, such as the encoder 510 of FIG. 5A, can encode the inter-patch connectivity information of each patch (generated by the point cloud encoder, such as the point cloud encoder 520 of FIGS. 5B and 5C) independently. The inter-patch connectivity information is the connectivity information that connects the vertices of one patch to another patch. In certain embodiments, the encoder may not transmit the inter-patch connectivity information of each patch. For example, when the inter-patch connectivity information is not transmitted, a decoder interconnects the neighboring pixels of each patch to reconstruct the mesh.

An encoder, such as the encoder 510 of FIG. 5A, can encode the inner-patch connectivity information of each patch (generated by the point cloud encoder, such as the point cloud encoder 520 of FIGS. 5B and 5C) independently. Inner-patch connectivity information is the connectivity information that connects each vertex within a single patch.

In certain embodiments, the encoder can signal whether each patch (as generated by a point cloud encoder) is fully connected, not connected, or partially connected. A fully connected patch is a portion of the mesh, while a patch that is not connected is a point cloud. A partially connected patch can be similar to the adaptive mesh 730 of FIG. 7A.

For a patch that is partially connected, an encoder will transmit the inner-patch connectivity. For a patch that is fully connected, the encoder can transmit an indication that the patch, when reconstructed, it is to be a mesh. That is, the encoder can transmit an indication that the patch, when reconstructed, is to be a mesh (and not a point cloud) even though the encoder does not transmit the connectivity information for that particular patch. Transmitting the indication instead of the connectivity information can reduce the size of the bitstream. When the decoder receives the indication that a particular patch is a mesh and does not receive any connectivity information associated with the patch, the decoder reconstructs the inner-patch connectivity information for that particular patch. To reconstruct the inner-patch connectivity information for that particular patch, the decoder can use a surface reconstruction technique such as Poisson surface reconstruction, parameterization-free projection for geometry reconstruction, and the like. In other embodiments, to reconstruct the inner-patch connectivity information for that particular patch, the decoder can use a 2D point traversal technique such as triangle strips.

For example, the patch 800 of FIG. 8 can be decoded by a decoder, along with an indication that the patch is to be a mesh. The patch 800 includes multiple vertices (points), such as the vertex 802 and the vertex 804. It is noted that when the decoder does not receive connectivity information for the patch 800, the decoder derives the connectivity information, and generates the derived mesh 810. The decoder uses the vertices of the patch, such as the vertex 802*a* and the vertex 804*a* to derive the connectivity information such as the edge 806.

In certain embodiments, a flag is signaled per polygon to indicate whether the predicted connections such as the connectivity information that was derived as illustrated in the derived mesh 810 are the right connections. If the flag is set to true, then the predicted connections are used to reconstruct the polygon connectivity in the decoder, else the actual connection information is sent.

Figure 9A:
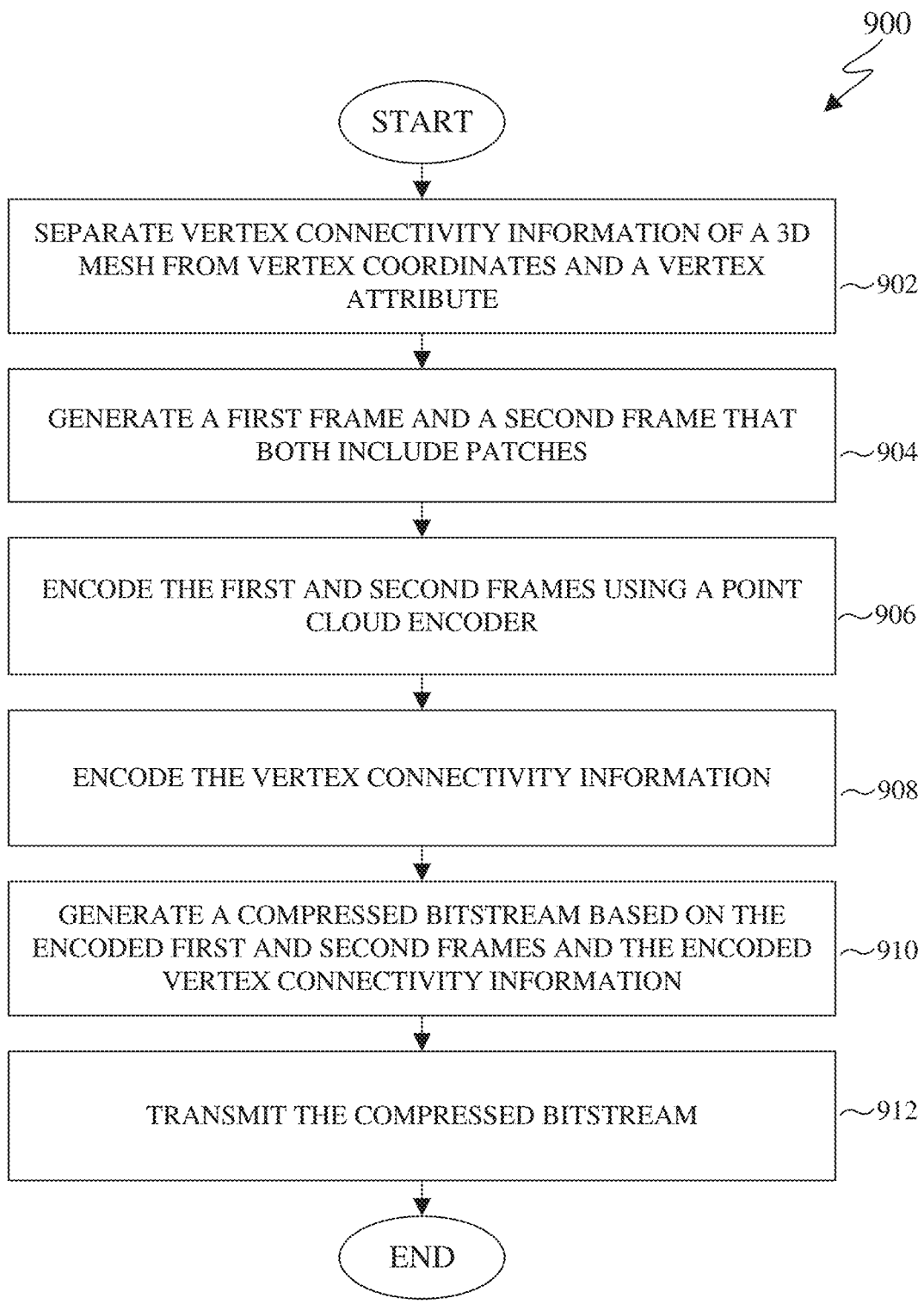
FIG. 9A illustrates example method for encoding a point cloud in accordance with an embodiment of this disclosure.

FIG. 9A illustrates example method 900 for encoding a point cloud in accordance with an embodiment of this disclosure. The method 900 can be performed by the server 104 or any of the client devices 106-116 of FIG. 1, the server 200 of FIG. 2, the electronic device 300 of FIG. 3, the encoder 510 of FIG. 5A, the encoder 510a of FIG. 5B, the encoder 510b of FIG. 5C, the encoder 510c of FIG. 5E, the encoder 610a of FIG. 6A, the encoder 610b of FIG. 6B, or any other suitable device or system. For ease of explanation, the method 900 is described as being performed by the encoder 510 of FIG. 5A.

In step 902, the encoder 510 separates the connectivity information of a mesh from the vertex coordinates and the vertex attribute. The mesh includes vertex indices that relate the connectivity information to each vertex. When the connectivity information is separated from the vertices, the vertices resemble a point cloud.

In step 904, the encoder 510 generates a first frame and a second frame that include one or more patches. The patches within a frame can be multiple regular patches, a raw patch, or a combination thereof. A regular patch visually represents a portion of the mesh, while a raw patch is visually represented as a block in data in the frame. The patch or patches included in the first frame represent the vertex coordinates of the mesh, while the patch or patches included in the second frame represent an attribute of the vertices of the mesh. For example, the patches in the frames can include at least one regular patch and no raw patches. For another example, the patches in the frames can include at least one regular patch and a raw patch. For yet another example, the frames can include a single raw patch and no regular patches.

In step 906, the encoder 510 encodes the first and second frames using a video encoder. The video encoder can be configured to encode point clouds. In certain embodiments, the encoder 510 encodes the first frame that represents the vertex coordinates, and then decodes the first frame. After decoding the first frame, the encoder 510 reconstructs the vertices. The encoder 510 uses the reconstructed vertices to interpolate the attribute values from the original mesh and then generates the second frame based on the interpolated values. After the frames are encoded, the encoder 510 can multiplex the frames into a first bitstream.

In step 908, the encoder 510 encodes the vertex connectivity information and generates a second bitstream. In certain embodiments, the connectivity information is encoded based on the order that the vertex coordinates were encoded. For example, after the first frame is encoded and decoded, the encoder 510 reconstructs the vertex coordinates based on the decoded first frame. The encoder 510 then updates the vertex index coordinates from the reconstructed vertex coordinates. The encoder 510 uses the updated vertex index when the connectivity information is encoded.

When the connectivity information is encoded using the updated vertex index (which is based on the reconstructed vertex coordinates), the encoder 510 can generate a vertex traversal map. The vertex traversal map relates the traversal order of the encoded connectivity information to a vertex order of the updated vertex indices. In certain embodiments, the encoder 510 then modifies the vertex traversal map by reverse mapping the vertex traversal map. In other embodiments, the encoder 510 does not modify the vertex traversal map via reverse mapping. If the vertex traversal map is reversed, the reversed traversal map is included in the second bitstream. Alternatively, if the vertex traversal map is not reversed, then the vertex traversal map is included in the second bitstream.

In certain embodiments, the encoder 510 encodes the connectivity information before generating the first and second frames. When the connectivity information is encoded first, the encoder 510 generates the frames that include a raw patch and no regular patches. The raw patch is based on the traversal order of the encoded connectivity information.

In certain embodiments, the encoder 510 selects and encodes a subset of the connectivity information, while another subset of the connectivity information is not encoded. The portion of the connectivity information that is encoded is included in the generated second bitstream.

For example, the processor is configured to compare the area of each polygon of the mesh to a threshold. Based on the comparison, the encoder 510 determines whether to include the connectivity information for that polygon in the compressed bitstream. When the area is larger than the threshold, the encoder 510 will encode the connectivity information for that polygon. When the area is smaller than the threshold, the encoder 510 may determine not to encode connectivity information for that polygon. Any connectivity information that is not encoded is not included in the second bitstream and subsequently not included in the compressed bitstream that is generated in step 910.

For another example, the encoder 510 identifies whether a patch is fully connected. A patch is fully connected when connectivity information relates each vertex to another vertex. A patch is not fully connected when a portion of the connectivity information is absent. For instance, certain portions of the mesh may not include connectivity information. When a patch is not fully connected, then the encoder 510 encodes the available encoded connectivity information. Alternatively, when the patch is fully connected, the encoder can determine not to encode connectivity information for that patch. When the connectivity information for a patch is not encoded, it is not transmitted to a decoder, such as the decoder 550, such that the decoder 550 would derives the mesh.

In step 910, the encoder 510 generates a compressed bitstream by combining the first bitstream and the second bitstream. In certain embodiments, the encoder 510 does not include the second bitstream, or includes a portion of the second bitstream, when generating the compressed bitstream. In step 912, the encoder 510 transmits the bitstream. The bitstream can be ultimately transmitted to a decoder, such as the decoder 550 of FIG. 5B.

Figure 9B:
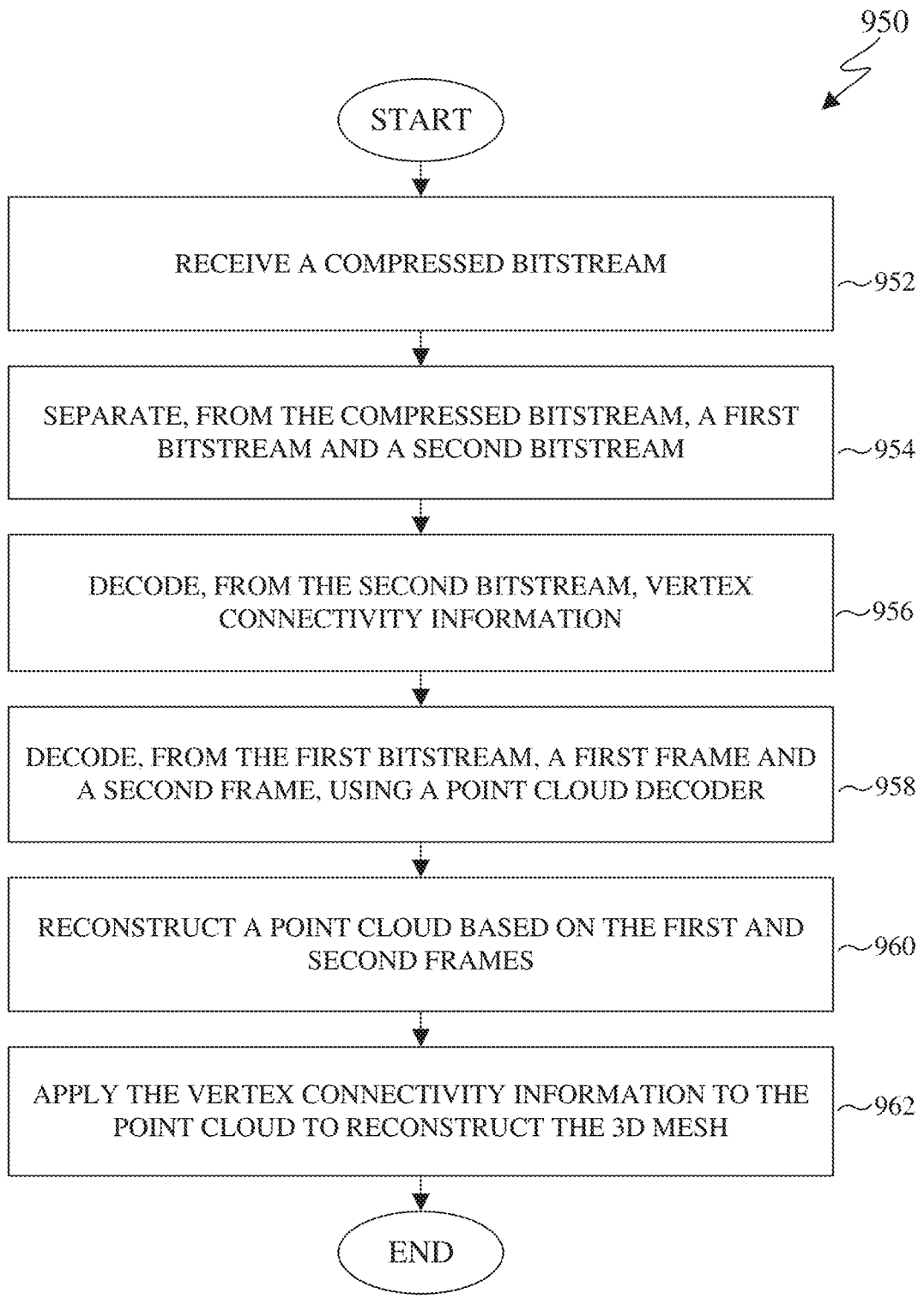
FIG. 9B illustrates example method for decoding a point cloud in accordance with an embodiment of this disclosure.

FIG. 9B illustrates example method 950 for decoding a point cloud in accordance with an embodiment of this disclosure. The method 950 can be performed by the server 104 or any of the client devices 106-116 of FIG. 1, the server 200 of FIG. 2, the electronic device 300 of FIG. 3, the decoder 550 of FIG. 5A, the decoder 550a of FIG. 5F, the decoder 550b of FIG. 5G, the decoder 550c of FIG. 5H, the decoder 650 of FIG. 6C, or any other suitable device or system. For ease of explanation, the method 950 is described as being performed by the decoder 550 of FIG. 5A.

The method 950 begins with the decoder 550 receiving a compressed bitstream (step 952). The received bitstream can include encoded connectivity information, the encoded point cloud that was mapped onto multiple 2D frames. In step 954, the decoder 550 separates the compressed bitstream into two bitstreams. The first bitstream can include the encoded vertex coordinates and attributes and the second bitstream can include the connectivity information.

In step 956, the decoder 550 decodes the connectivity information from the second bitstream. In step 958, the decoder 550 decodes the first and second frames. The first and second frames include regular patches, raw patches, or a combination thereof. A regular patch visually represents a portion of the mesh, while a raw patch is visually represented as a block in data in the frame. The decoder 550 can use a connectivity decoder to decode the connectivity information and a video decoder to decode the first and second frames. The video decoder can be configured to decode a point cloud. The first frame and the second frame can include patches. The patches in the first frame can represent the coordinate location of the vertices of the mesh and the patches in the second frame can represent an attribute of the mesh.

In step 960, the decoder 550 reconstructs the point cloud based on the first and second frames. For example, the decoder 550 using a using the video decoder configured to reconstruct a point cloud, identifies the coordinates for each vertex based on the location and value of the pixels pixel in the first frame, and places the vertex in 3D space to generate a point cloud. The decoder 550 can then apply the attribute to each vertex.

In certain embodiments, when the first and second frames include a raw patch and no regular patches, then decoder 550 reconstructs the point cloud using the raw that that is organized based on the traversal order of the connectivity information.

In certain embodiments, the decoder 550 determines from the connectivity information whether any of the patches are fully connected. The decoder can determine that a patch is fully connected when no connectivity information for that patch is included in the second bitstream. In response to determining that a patch is fully connected, the decoder 550 reconstructs the inner patch connectivity information using triangle fans to fill connections for the first patch.

In certain embodiments, before the connectivity information is applied to the point cloud (in step 962, below), the vertex index needs to be updated such that the index of the connectivity information matches the index of the reconstructed point cloud.

For example, the decoder 550 can separate and identify from the compressed bitstream a reverse vertex traversal map or a traversal map. When the reverse vertex traversal map is identified, the decoder 550 updates the vertex indices associated with the connectivity information based on the reverse vertex traversal map. When the traversal map is identified, the decoder 550 updates an ordering of the vertex coordinates and the vertex attribute associated with the reconstructed point cloud based on the vertex traversal map. It is noted that when the vertex traversal map or the reverse vertex traversal map is identified, the first and second frames include regular patches or a combination of regular patches and a raw patch.

In step 962, the decoder 550 applies the connectivity information to the reconstructed point cloud to reconstruct the mesh. For example, the decoder 550 generates the mesh based on the frame representing the vertex coordinates, the frames representing a vertex attribute and the connectivity information. For example, the connectivity information connects the vertices in 3D space. Then the decoder 550 applies weighted attribute information of each vertex to its associated face.

Although FIG. 9A illustrates one example for mesh encoding, and FIG. 9B illustrates one example for mesh decoding, various changes may be made to FIGS. 9A and 9B. For example, while shown as a series of steps, various steps in FIGS. 9A and 9B could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A decoding device for mesh decoding, the decoding device comprising:
   a communication interface configured to receive a compressed bitstream; and
   a processor operably coupled to the communication interface, the processor configured to:
      separate, from the compressed bitstream, (i) a vertex traversal map representing a relationship between vertex indices and vertex coordinates of a three dimensional (3D) mesh, (ii) a first bitstream, and (iii) a second bitstream,
      decode, from the second bitstream, connectivity information of the 3D mesh,
      decode, from the first bitstream, a first frame and a second frame that both include one or more patches, wherein the one or more patches included in the first frame represent the vertex coordinates of the 3D mesh and the one or more patches included in the second frame represent a vertex attribute of the 3D mesh,
      reconstruct a point cloud based on the first and second frames,
      modify, based on the vertex traversal map, at least one of an order of the vertex indices or an order of the vertex coordinates, and
      apply the connectivity information to the point cloud to reconstruct the 3D mesh.

2. The decoding device of claim 1, wherein the one or more patches of the first and second frames include regular patches and a raw patch.

3. The decoding device of claim 2, wherein when the vertex traversal map is a reverse vertex traversal map, the processor is configured to:
   update the vertex indices associated with the connectivity information based on the reverse vertex traversal map, wherein the reverse vertex traversal map is based on the order of the vertex coordinates; and
   reconstruct the 3D mesh using the connectivity information and the point cloud.

4. The decoding device of claim 2, wherein the processor is further configured to:
   change the order of the vertex coordinates and the vertex attribute associated with the reconstructed point cloud based on the vertex traversal map; and
   reconstruct the 3D mesh using the connectivity information and the point cloud.

5. The decoding device of claim 1, wherein:
   the one or more patches of the first and second frames include a raw patch and no regular patches; and the processor is configured to reconstruct the point cloud, using the raw patch that is organized based on a traversal order of vertices identified in the connectivity information.

6. The decoding device of claim 1, wherein the processor is further configured to:
determine, from the connectivity information, whether a first patch of the one or more patches is fully connected; and
in response to determining that the first patch is fully connected, reconstruct inner patch connectivity information using at least one of a triangle fan, a Poisson reconstruction, and triangle strips, in order to fill connections for the first patch.

7. An encoding device for mesh encoding, the encoding device comprising:
a processor configured to:
separate connectivity information of a three dimensional (3D) mesh from vertex coordinates and a vertex attribute, wherein the 3D mesh includes vertex indices,
generate a first frame and a second frame that both include one or more patches, wherein the one or more patches included in the first frame represent the vertex coordinates of the 3D mesh and the one or more patches included in the second frame represent the vertex attribute of the 3D mesh,
encode the first and second frames to generate a first bitstream,
encode the connectivity information to generate a second bitstream,
generate a vertex traversal map based in part on a traversal order of the encoded connectivity information, the vertex traversal map representing a relationship between the vertex indices and the vertex coordinates,
modify at least one of the vertex traversal map or an order of the vertex indices, and
generate a compressed bitstream by multiplexing the first bitstream and the second bitstream; and
a communication interface operably coupled to the processor, the communication interface configured to transmit the compressed bitstream.

8. The encoding device of claim 7, wherein:
the one or more patches of the first and second frames include regular patches and a raw patch;
the processor is further configured to:
in response to encoding the first frame, decode the first frame;
reconstruct the vertex coordinates from the decoded first frame; and
update the vertex indices based on the reconstructed vertex coordinates; and
to encode the connectivity information the processor is configured to use the updated vertex indices.

9. The encoding device of claim 8, wherein:
in response to encoding the connectivity information using the updated vertex indices, the processor is further configured to:
generate the vertex traversal map that relates the traversal order of the encoded connectivity information to a vertex order of the updated vertex indices, and
modify the vertex traversal map by reverse mapping the vertex traversal map;

to generate the compressed bitstream the processor is further configured to multiplex the first bitstream, the second bitstream, and the modified vertex traversal map; and
the connectivity information is encoded in a different order than the vertex coordinates and the vertex attribute.

10. The encoding device of claim 8, wherein:
in response to encoding the connectivity information using the updated vertex indices, the processor is configured to generate the vertex traversal map that relates the traversal order of the encoded connectivity information to a vertex order of the updated vertex indices;
to generate the compressed bitstream the processor is further configured to multiplex the first bitstream, the second bitstream, and the vertex traversal map; and
the connectivity information is encoded in a different order than the vertex coordinates and the vertex attribute.

11. The encoding device of claim 7, wherein the one or more patches of the first and second frames include a raw patch and no regular patches.

12. The encoding device of claim 11, wherein, in response to encoding the connectivity information, the processor is configured to generate the raw patch of the first and second frames based on the traversal order of the encoded connectivity information.

13. The encoding device of claim 7, wherein the processor is further configured to:
identify whether a first patch of the one or more patches is fully connected;
in response to identifying that the first patch is not fully connected, including in the second bitstream the connectivity information of the first patch; and
in response to determining the first patch is fully connected, not including in the second bitstream the connectivity information of the first patch.

14. The encoding device of claim 7, wherein:
the processor is further configured to compare an area of a first polygon of the 3D mesh to a threshold; and
the communication interface is configured to transmit the first bitstream that corresponds to the first polygon based on the comparison.

15. The encoding device of claim 7, wherein the processor is further configured to:
select a subset of the connectivity information; and
encode the subset of the connectivity information to generate the second bitstream.

16. A method for decoding a mesh, the method comprising:
receiving a compressed bitstream;
separating, from the compressed bitstream, (i) a vertex traversal map representing a relationship between vertex indices and vertex coordinates of a three dimensional (3D) mesh, (ii) a first bitstream, and (iii) a second bitstream;
decoding, from the second bitstream, connectivity information of the 3D mesh;
decoding, from the first bitstream, a first frame and a second frame that both include one or more patches, wherein the one or more patches included in the first frame represent the vertex coordinates of the 3D mesh and the one or more patches included in the second frame represent a vertex attribute of the 3D mesh;
reconstructing a point cloud based on the first and second frames;

modify, based on the vertex traversal map, at least one of an order of the vertex indices or an order of the vertex coordinates; and applying the connectivity information to the point cloud to reconstruct the 3D mesh.

17. The method of claim 16, wherein the one or more patches of the first and second frames include regular patches and a raw patch.

18. The method of claim 17, wherein, when the vertex traversal map is a reverse vertex traversal map, the method comprises:

updating the vertex indices associated with the connectivity information based on the reverse vertex traversal map, wherein the reverse vertex traversal map is based on the order of the vertex coordinates; and reconstructing the 3D mesh using the connectivity information and the point cloud.

19. The method of claim 17, further comprising:

change the order of the vertex coordinates and the vertex attribute associated with the reconstructed point cloud based on the vertex traversal map; and reconstructing the 3D mesh using the connectivity information and the point cloud.

20. The method of claim 16, wherein:

the one or more patches of the first and second frames include a raw patch and no regular patches; and the method further comprises reconstructing the point cloud, using the raw patch that is organized based on a traversal order of vertices identified in the connectivity information.

\* \* \* \* \*